United States Patent [19]

Hamano et al.

[11] Patent Number: 5,339,600
[45] Date of Patent: Aug. 23, 1994

[54] CAP CONVEYING UNIT

[75] Inventors: Ichirou Hamano; Munetaka Honda; Tateki Takakuwa, all of Ishikawa; Toshiyuki Omori; Yasuaki Kotani, both of Chiba, all of Japan

[73] Assignees: Shibuya Kogyo Co., Ltd., Ishikawa; Kao Corporation, Tokyo, both of Japan

[21] Appl. No.: 34,279

[22] Filed: Mar. 22, 1993

[30] Foreign Application Priority Data

| Mar. 25, 1992 | [JP] | Japan | 4-98785 |
| Mar. 25, 1992 | [JP] | Japan | 4-98786 |
| Mar. 25, 1992 | [JP] | Japan | 4-98787 |
| Mar. 25, 1992 | [JP] | Japan | 4-98791 |

[51] Int. Cl.$^5$ ............... B67B 3/064; B67B 3/062; B65B 7/28
[52] U.S. Cl. ............... 53/306; 53/308; 53/357; 53/362
[58] Field of Search ............ 53/306, 308, 312, 357, 53/362, 281

[56] References Cited

U.S. PATENT DOCUMENTS

| 2,423,965 | 7/1947 | Coyle | 53/362 X |
| 2,655,302 | 10/1953 | Hohl et al. | 53/306 X |
| 3,820,305 | 6/1974 | Van Der Meer | 53/308 |
| 4,640,733 | 2/1987 | Bogren | 53/362 X |
| 4,724,654 | 2/1988 | Dahlin et al. | 53/362 X |
| 4,765,119 | 8/1988 | Aidlin et al. | 53/308 |

*Primary Examiner*—Horace M. Culver
*Attorney, Agent, or Firm*—Flynn, Thiel, Boutell & Tanis

[57] ABSTRACT

Cap holder means which holds the inner peripheral surface of a cap has an outer diameter which may be shrunk to a value less than and expanded to another value greater than the diameter of the inner peripheral surface of the cap. When the cap holder means assumes a shrunk condition in which the outer diameter thereof is less than the diameter of the inner peripheral surface of the cap, the cap holder means is capable of smoothly receiving a cap from a cap feeder. Upon receiving a cap, the cap holder means may be changed to an expanded condition presenting an outer diameter greater than the diameter of the inner peripheral surface of the cap, thereby allowing caps of any varying internal diameter to be centered with respect to the cap holder means. This allows a smooth delivery of the cap from the cap holder means to a capping head.

36 Claims, 35 Drawing Sheets

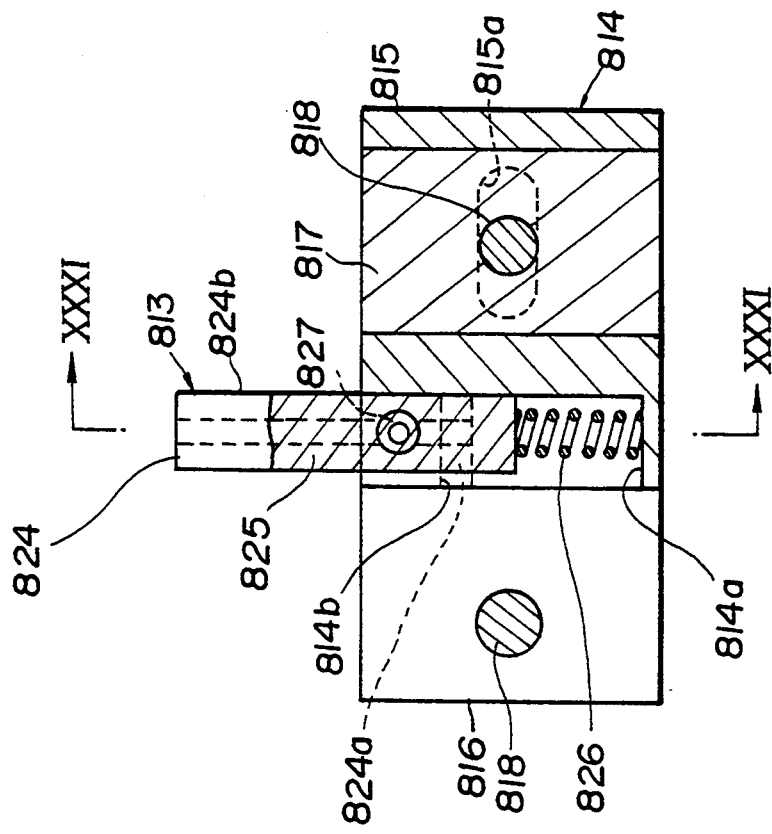
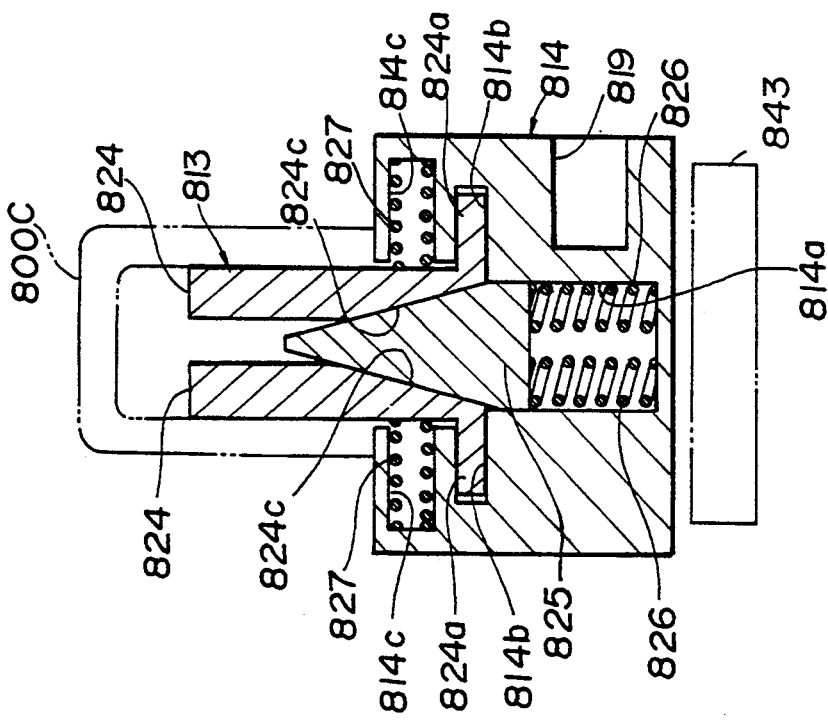

CAP CONVEYING UNIT

FIELD OF THE INVENTION

The invention relates to a cap conveying unit for delivering caps as fed from a sorter or chute to a capping head.

DESCRIPTION OF THE PRIOR ART

A conventional cap conveying unit normally comprises a rotatable body, and a plurality of cap holder means disposed around the periphery of the rotatable body at an equal interval and each operable to hold the inner peripheral surface of a cap. A cap as supplied from a cap feeder such as a sorter or chute is received by the cap holder means, which in turn delivers the cap which it received to a capping head which applies such cap to a vessel for capping purpose. The cap holder means is generally formed by a pin-shaped cap retainer which engages the inner peripheral surface of the cap for conveying it. (See Japanese Laid-Open Patent Application No. 172,691/1985 and Japanese Utility Model Publication No. 31,996/1986).

In a cap conveying unit of the kind described, as the diameter of the inner peripheral surface of the cap is changed, the position of the cap relative to the pin-shaped retainer will be displaced from its position where it is centered thereto. Because the capping head operates in synchronism with the cap retainer, a displacement of the position of the cap relative to the cap retainer results in an offset of the position of the cap relative to the capping head. Accordingly, when the diameter of the inner peripheral surface of the cap undergoes a large variation as a result of an attempt to increase the extent of applicability of the arrangement with an increased varieties of caps, there arises a risk that a smooth delivery of the cap from the cap retainer to the capping head may not be achieved.

In the cap conveying unit mentioned above, a movement of the cap holder means takes place through the rotation of the rotatable member, so that the sequence in which the cap holder means move and the locus along which they move are predetermined, precluding a free choice of a sequence and a locus of movement.

As a consequence, if there occurs a failure to deliver a cap from the cap feeder to the cap holder means, the resulting empty cap holder means continues to be conveyed to a position which is designed for delivery of a cap to the capping head, thereby resulting in the occurrence of a vessel which is not capped. This degrades the operational efficiency of the capping head, and it then becomes necessary to reject such an uncapped vessel from a normal line of operation, also requiring a recovery of the rejected vessel.

As a result of the limitation upon the locus of movement of the cap holder means, a space which is available to provide a connection between the cap feeder and the cap conveying unit is also limited, and the number of cap feeders which feed respective different varieties of caps must be limited. The connection takes place in a manner such that a plurality of sorters are located at remote positions and are associated with individual chutes so that the other end of the respective chutes may be disposed adjacent to the cap conveying unit. This results in a complicated chute changing operation when the variety of caps is to be changed.

SUMMARY OF THE INVENTION

In view of the foregoing, the first invention provides a cap conveying unit which is capable of maintaining a cap centered with respect to a cap retainer if the diameter of the inner peripheral surface of the cap is changed.

The second invention provides a cap conveying unit which permits a free choice of a sequence in which cap holder means are moved or a locus of movement along which they are moved.

The first invention relates to a cap conveying unit including cap holder means for holding the inner peripheral surface of a cap, and conveying means for conveying the cap holder means along a circulating path, the cap holder means receiving a cap as fed from a cap feeder and delivering it to a capping head which applies it to a vessel for capping purpose. In accordance with the invention, the outer diameter of the cap holder means is variable between a shrunk condition having a diameter less than that of the inner peripheral surface of the cap and an expanded condition having a diameter greater than that of the inner peripheral surface of the cap.

With this arrangement, at a location where the cap holder means receives a cap from the cap feeder, the outer diameter of the cap holder means can be made shrunk to a diameter less than that of the inner peripheral surface of the cap to allow the cap to be smoothly handed from the cap feeder to the cap holder means. After the cap holder means has received the cap, the outer diameter of the cap holder means can be expanded to its expanded condition of a diameter greater than that of the inner peripheral surface of the cap, whereby the cap can be centered on the cap holder means regardless of whatever inner diameter the cap may have. Accordingly, a smooth delivery of the cap from the cap holder means to the capping head can be assured.

In accordance with the second invention, the cap holder means is provided on a separate holder, and each holder is conveyed by conveying means along a circulating path. With this arrangement, a free choice of the layout of the conveying means which conveys the holders is allowed, thus enabling the locus along which the cap holder means is moved to be freely established. This allows a space to be secured for connection between the cap feeding unit and a cap feeder or feeders, which may be sufficient to enable a connection of the unit with a plurality of cap feeders. If required, by providing a branch unit or a collector for the holders, a plurality of parallel running paths may be defined for the holders, each of which may be associated with the separate cap feeder.

In addition, the conveying means which conveys the holders may be arranged so that if a failure occurs to deliver a cap from the cap feeder to the cap holder means, for example, only that holder which carries the empty cap holder means may be forced to pass through a reject path which is returned to a point upstream of the cap feeder by a short-cut, thus preventing the empty cap holder means from running to the capping head.

Above and other objects, features and advantages of the inventions will become apparent from the following description of several embodiments thereof with reference to the attached drawings.

BRIEF DESCRIPTION OF THE DRAWINGS

FIG. 30 is a cross section of one link 814 which constitutes an endless chain 812;

FIG. 31 is a cross section taken along the line XXXI—XXXI shown in FIG. 30;

DETAILED DESCRIPTION OF EMBODIMENTS

Figure 1:
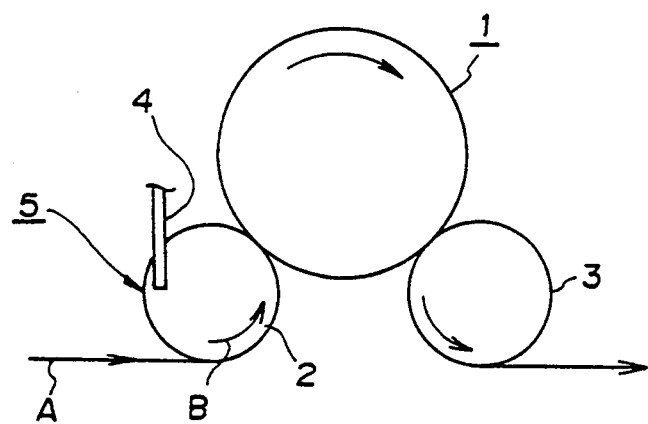
FIG. 1 is a schematic plan view of a first embodiment of the invention.

Referring to the drawings, several embodiments of the invention will now be described. Initially referring to FIG. 1, there is shown a rotary capper 1 which caps or applies a cap to a vessel, comprising an inlet star wheel 2 and an outlet star wheel 3. A vessel is conveyed in the direction indicated by an arrow A by a conveyor, not shown, and is handed by the inlet star wheel 2 onto the capper 1. A capped vessel is handed off the capper 1 to the exterior by the outlet star wheel 3.

A chute 4 is illustrated as a cap feeder, from which a cap is fed to a cap conveying unit 5 located above the inlet star wheel 2, and is then conveyed in the direction of an arrow B by the unit 5 to be supplied to a capping head on the capper 1. In the embodiment shown, a cap C is generally cylindrical in configuration, as shown in FIG. 4, and the internal side of the cylindrical cap is formed with threads for threadably engaging the cap with the vessel at a later stage.

Figure 2:
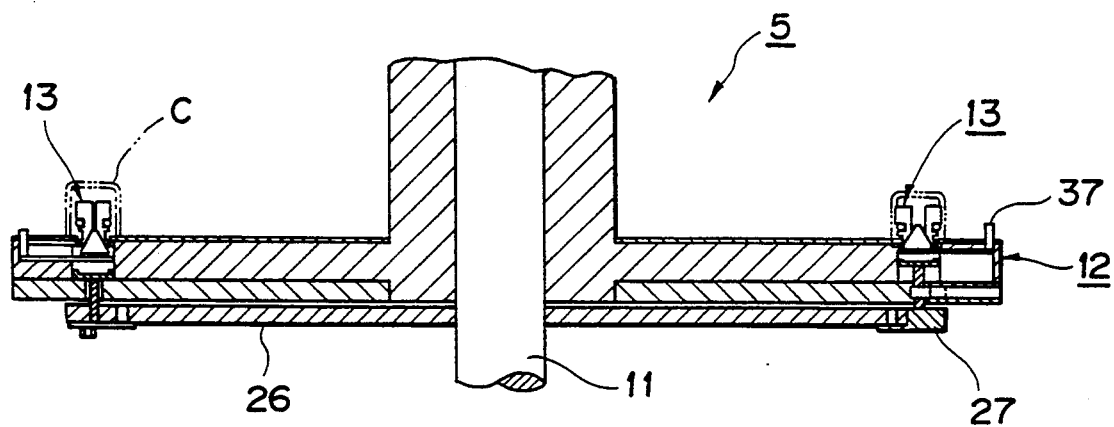
FIG. 2 is a cross section of a cap feeding unit 5 shown in FIG. 1.
Figure 3:
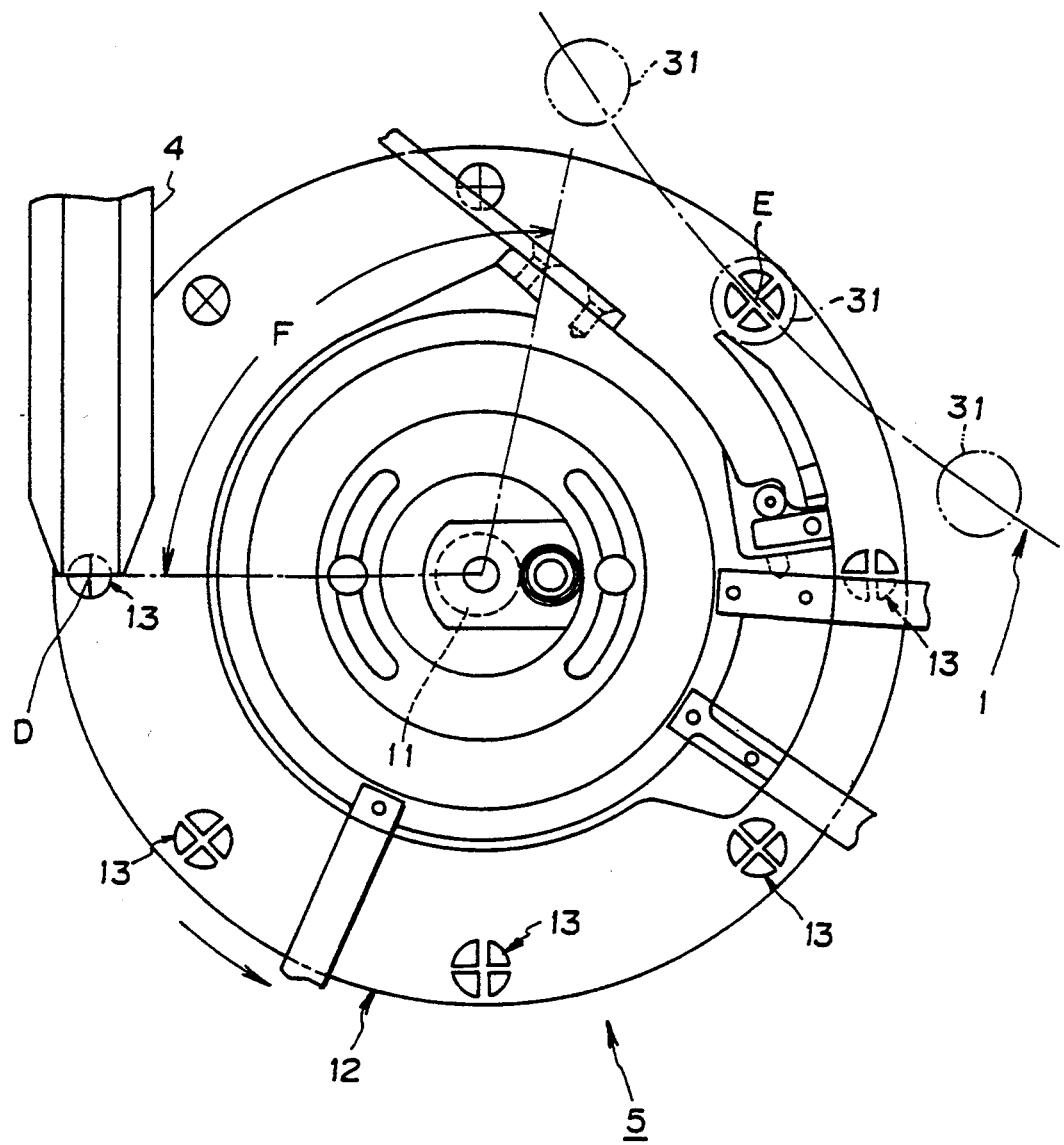
FIG. 3 is a plan view of FIG. 2.

As shown in FIGS. 2 and 3, the cap conveying unit 5 comprises a vertically disposed drive shaft 11, and a rotatable body 12 which is fixedly mounted on the drive shaft 11 for integral rotation therewith and which is provided with a plurality of cap holder means 13 around the periphery thereof at an equal circumferential spacing.

Figure 4:
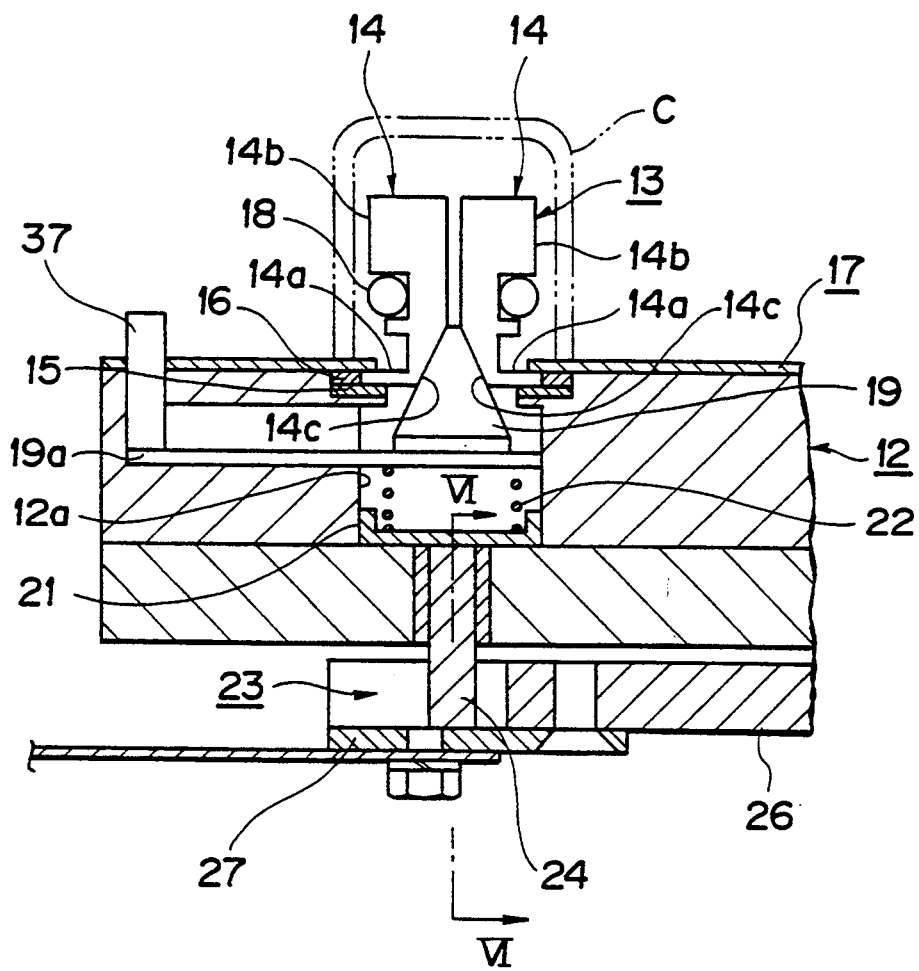
FIG. 4 is a side elevation, partly in section and to an enlarged scale, of a left-hand portion of FIG. 2.
Figure 5:
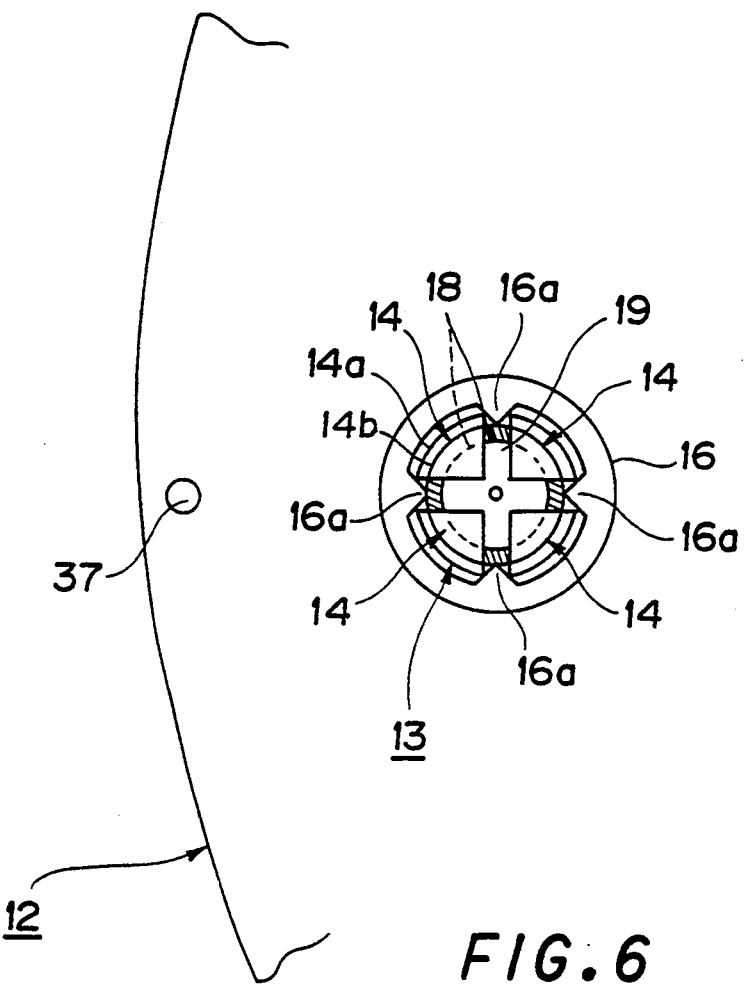
FIG. 5 is a plan view of FIG. 4 from which a lid 17 is omitted.

FIGS. 4 and 5 show the cap holder means 13 in detail. Specifically, it comprises four movable members 14, which are formed by dividing a solid cylindrical member having a slide 14a in the form of a flange at its bottom into four equal circumferential portions. The slide 14a of each movable member 14 is slidably placed on a fixing plate 15 which is disposed on a step of a stepped opening 12a formed in the rotatable body 12.

A ring-shaped guide plate 16 is placed on top of the fixing plate 15, and is formed with triangular guides 16a which project radially inward at four positions, equidistantly spaced apart around the inner peripheral surface thereof, as shown in FIG. 5. The corner of the slide 14a of each movable member 14 is disposed in abutment against the guides 16a so that these guides 16a guide each movable member 14 for reciprocating motion in the radial direction.

Referring to FIG. 4, the fixing plate 15 and the guide plate 16 are secured to the rotatable body 12 by a plate-shaped lid 17 which is placed on top of the rotatable body 12 and secured thereto, the lid 17 slidably covering the top surface of the slide 14a of each movable member 14 to prevent it from being disengaged in the upward direction away from the rotatable body 12.

Each movable member 14 includes a shank 14b, and a ring-shaped spring 18 is wrapped around the bottom of the four shanks 14b in common. When the resilience of the spring 18 holds the shanks 14b of the four movable members 14 assembled together or urged toward each other, the cap holder means 13 assumes a shrunk condition, presenting an outer diameter depicted by the shanks which is less than the diameter of the inner peripheral surface of the cap C (as shown in FIG. 4).

Figure 7:
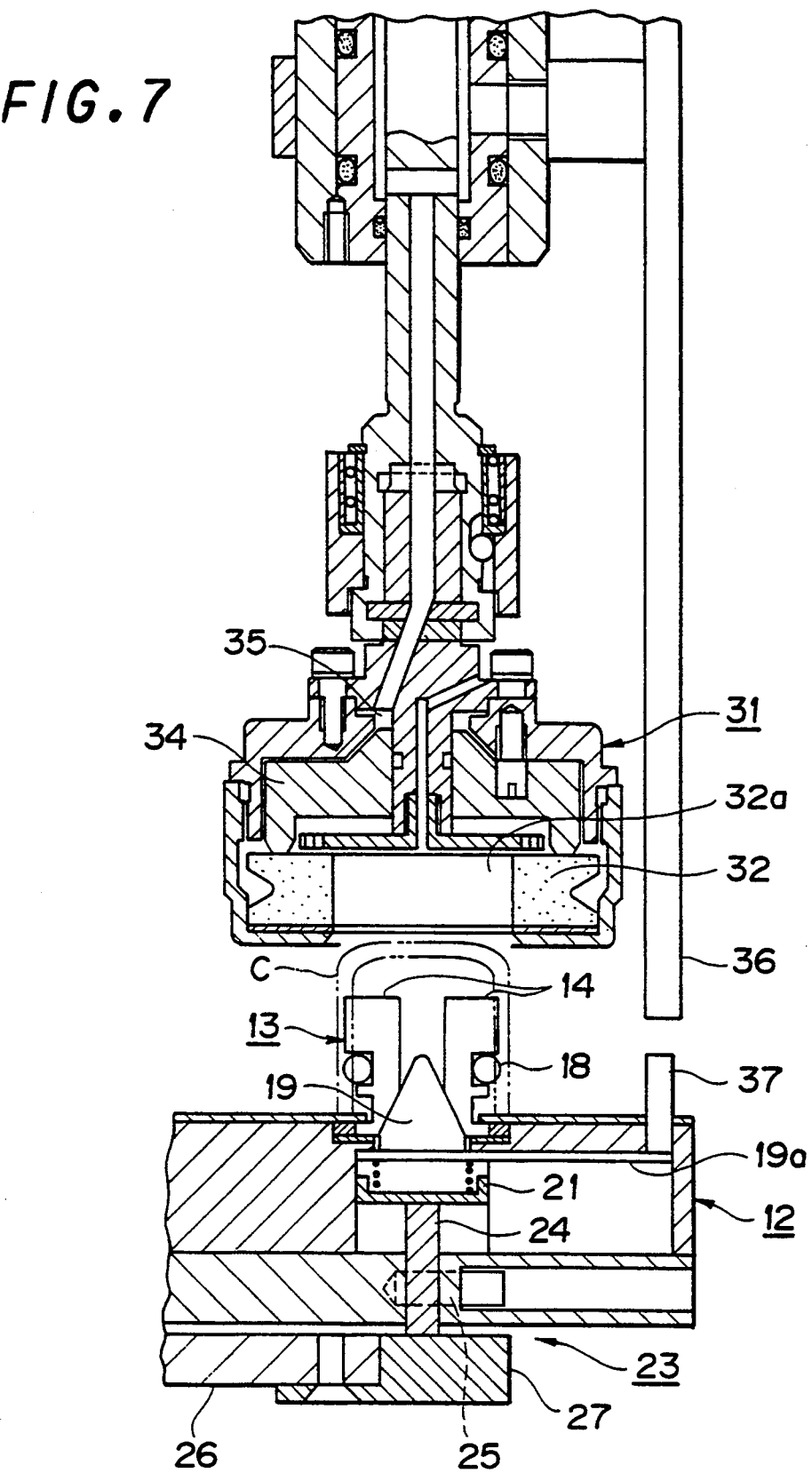
FIG. 7 is a cross section, to an enlarged scale, of a right-hand portion of FIG. 2.

By contrast, when the movable members 14 are forced radially outward against the resilience of the spring 18, the shanks 14b can assume an expanded condition (as shown in FIG. 7), presenting an outer diameter which is greater than the diameter of the inner peripheral surface of the cap. This is accomplished by a conical cam member 19 elevatably fitted in the stepped opening 12a formed in the rotatable body 12. Each movable member 14 is formed with a cam surface 14c around its inner surface at its bottom, and the cam surface 14c is resiliently urged against the peripheral surface of the cam member 19.

An elevating plate 21 is elevatably disposed below the cam member 19 and within the stepped opening 12a, with a spring 22 disposed between the elevating plate 21 and the cam member 19. The resilience of the spring 22 is chosen so that when the elevating plate 21 assumes its lowermost position, the resilience of the spring 22 is overcome by the resilience of the ring-shaped spring 18, so that the shanks 14b of the movable members 14 are assembled together by the action of the spring 18 while depressing the cam member 19. Under this condition, the shanks 14b assume a shrunk condition, presenting an outer diameter which is less than the diameter of the inner peripheral surface of the cap.

By contrast, when the elevating plate 21 is driven upward to compress the spring 22, the increased resilience of the spring 22 overcomes the resilience of the ring-shaped spring 18 to raise the cam member 19, whereby the movable members 14 then assume an expanded condition, presenting an outer diameter which is greater than the diameter of the inner peripheral surface of the cap C.

Figure 6:
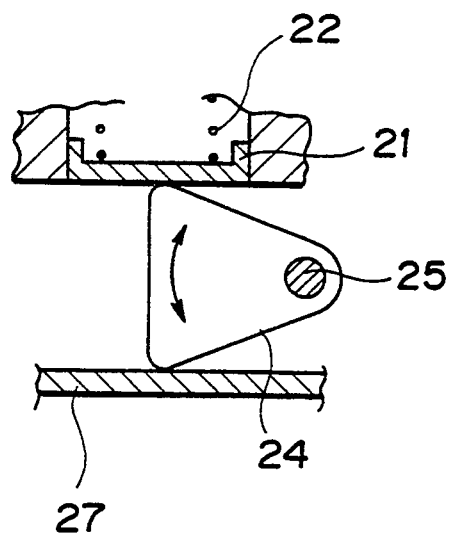
FIG. 6 is a schematic cross section taken along the line VI—VI shown in FIG. 4.

A cam mechanism 23 which causes an elevating motion of the elevating plate 21 comprises a triangular cam plate 24 shown in FIG. 6 which is disposed to extend along the direction along which the rotatable body 12 rotates and which has its inner end pivotally or rockably mounted on the rotatable body 12 by means of a pin 25. At its outer end, the bottom of the cam plate 24 engages a cam member 27 mounted on a fixing plate 26 (FIG. 4) while the top of the cam plate 24 is disposed in abutment against the bottom surface of the elevating plate 21.

Accordingly, as the rotatable body 12 rotates, the connection through the pin 25 causes the cam plate 24 to rotate integrally with the rotatable body 12. A cam surface on the cam member 27 causes a rocking motion of the cam plate 24 about the pin 25, thereby causing an elevating motion of the elevating plate 21. Referring to FIG. 3, the cam member 27 is profiled to raise the elevating plate 21 to maintain the cap holder means 13 in its shrunk condition during a zone F starting from a cap receiving position D and going back, as viewed in the direction of rotation of the rotatable body 12, to a cap delivery position E where the cap is delivered from the cap holder means 13 to a capping head 31.

Referring to FIG. 7, the capping head 31 is fundamentally of a known construction. Specifically, the capping head 31 includes a gripping member 32 in the form of a ring formed of rubber which grips the periphery of the cap C. The gripping member 32 is centrally formed with an opening 32a to receive the cap C therein. The capping head 31 is arranged to undergo an elevating motion by means of an elevating mechanism, not shown, and also undergoes a rotary movement by means of a rotary drive mechanism. When it is lowered by the elevating mechanism, it is located at the cap delivery position E and is capable of receiving the cap C which has been held by the cap holder means 13 into the opening 32a.

The capping head 31 also includes a piston 34 disposed above the gripping member 32, and a pressure chamber 35 is defined above the piston 34. A compressed air may be introduced into the pressure chamber 35 to depress the piston 34 to thereby cause an elastic deformation of the gripping member 32, thus reducing the internal diameter of the opening 32a to grip the cap C firmly.

The capping head 31 also includes an urging member 36 which causes the cap holder means 13 to change from the expanded position to the shrunk position of the movable members 14 as the capping head 31 is lowered relative to the cap holder means before the cap C held by the cap holder means 13 is inserted into the opening 32a and is gripped by the gripping member 32.

Specifically, the cam member 19 of the cap holder means 13 is formed with a projection 19a extending from the bottom thereof in the radially outward direction of the rotatable body 12, and a pin 37 is fixedly mounted on the free end of the projection 19a to project above the upper surface of the rotatable body 12. The urging member 36 is elevated integrally with the capping head 31, and when it is lowered, it bears against the pin 37 to force down the cam member 19 against the resilience of the spring 22, thus changing the movable members 14 from its expanded to its shrunk condition.

In the described arrangement, when the cap holder means 13 is conveyed by the rotation of the rotatable body 12 and reaches the zone F shown in FIG. 3, the cam member 27 acts through the cam plate 24 to lower the elevating plate 21, whereby the cap holder means 13 assumes its shrunk condition. When the cap holder means 13 reaches the cap receiving position D under this condition, it is capable of receiving the cap C from the chute 4. Since the cap holder means 13 then assumes its shrunk condition, the advancement of the cap holder means 13 into the cap C to hold its inner peripheral surface is facilitated.

When the cap holder means 13 is inserted into the cap C and moves past the cap receiving position D, the cam member 27 causes an angular movement of the cam plate 24 to raise the elevating plate 21, whereupon the cap holder means 13 assumes its expanded condition. The cap C is then centered with respect to the cap holder means 13. Such centering action is true whenever the variety of the cap is changed and the cap obtains a different internal diameter. Accordingly, the cap C can always be centered with respect to the cap holder means 13 regardless of the internal diameter thereof.

While maintaining the cap C centered thereon, the cap holder means 13 then moves to the cap delivery position E, where the capping head 31 is lowered to allow the cap C to be inserted into the opening 32a formed in the gripping member 32. A smooth insertion can be assured since the cap C is already centered with respect to the cap holder means 13.

More specifically, before the gripping member 32 grips the cap C, the urging member 36 of the capping head 31 bears against the pin 37 to move the cam member 19 down, whereby the movable members 14 are changed from their expanded to their shrunk condition, thus leaving the cap C free relative to the cap holder means 13 while it is inserted into the opening 32a of the capping head 31.

Thereupon the gripping member 32 is elastically deformed by the piston 34 to grip the periphery of the cap C firmly, and accordingly the capping head 31 is capable of gripping the cap C without any influence from the cap holder means 13. In this manner, a centering of the cap C with respect to the capping head 31 is assured while it is gripped by the capping head 31.

Subsequently, the cap C is moved away from the cap holder means 13 as the capping head 31 is being raised, and simultaneously, a movement of the urging member 36 away from the pin 37 allows an upward movement of the cam member 19, whereby the movable members 14 return from their shrunk to their expanded condition. However, since the cap C is now completely gripped by the capping head 31, there is no influence upon the cap C if the cap holder means 13 is returned to its expanded condition. The cap C gripped by the capping head 31 is then fitted around the mouth of a vessel. During this process, the cap is smoothly fitted around the mouth of the vessel since it is centered with respect to the capping head 31. The capping operation of the vessel takes place by rotating the capping head 31 by the rotary drive mechanism mentioned above under this condition.

On the other hand, the emptied cap holder means 13 after it has delivered the cap C onto the capping head 31 assumes its shrunk condition again when it enters the zone F, and the described operation is subsequently repeated.

Figure 8:
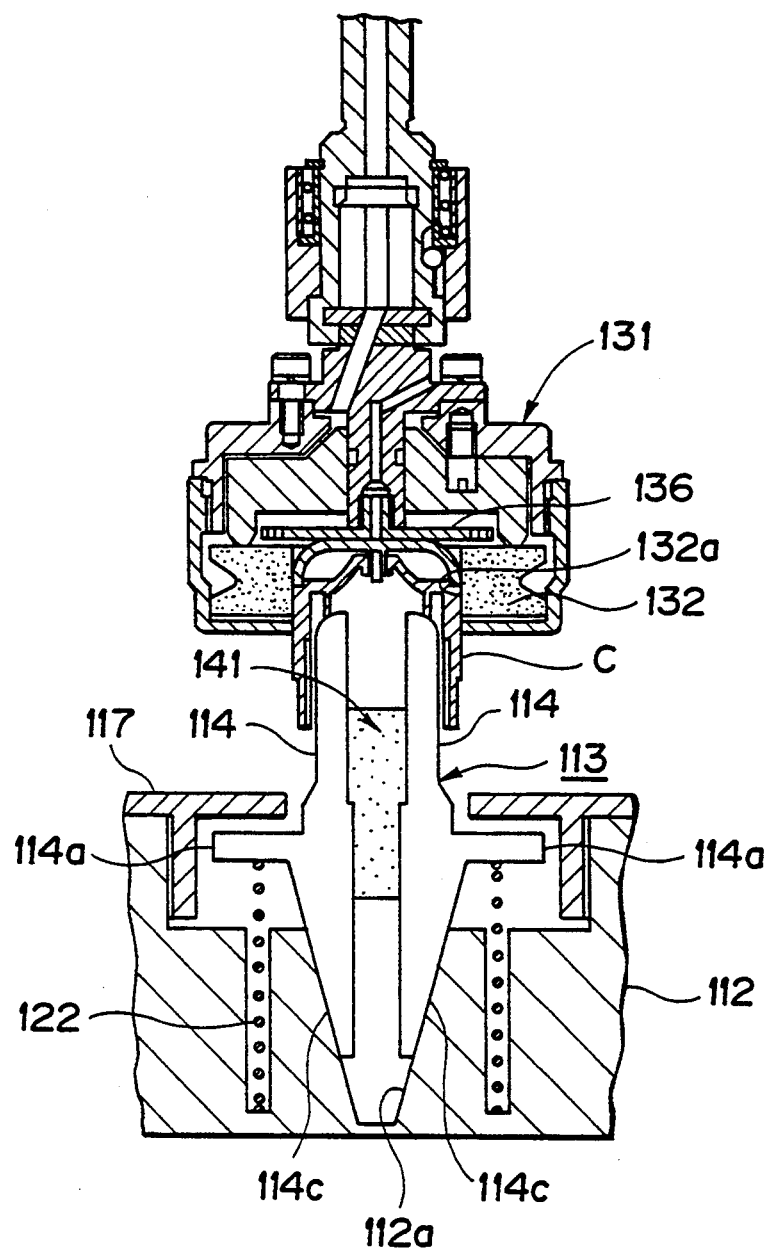
FIG. 8 is a cross section of a second embodiment of the invention.

FIG. 8 shows another embodiment of the invention in which cap holder means 113 includes four movable members 114 (only two being shown in FIG. 8) which are counterparts of the movable members 14 mentioned above in that they are formed by dividing a cylindrical member into four equal circumferential parts. The top end of each movable member 114 is generally semi-spherical in configuration to facilitate a fitting of the cap C thereover. At a median elevation, the movable member 114 is formed with a flange 114a which extends radially outward, and a spring 122 is disposed between the flange 114a and a rotatable body 112 to urge and normally maintain the respective movable member 114 at its elevated position where the upper surface of the flange 114a bears against a lid 117 mounted on the rotatable body 112.

At its bottom portion, the periphery of each movable member 114 is formed with a cam surface 114c which is generally in the form of an inverted cone, and which is engaged with an inverted conical opening 112a formed in the rotatable body 112. A spring or elastic member 141 is disposed centrally between the movable members 114 to urge the respective movable members 114 radially outward so that the cam surface 114c of the respective movable member 114 is resiliently urged against the inner surface of the inverted conical opening 112a.

Accordingly, when the respective movable members 114 are urged by the spring 122 to their elevated positions, the inner surface of the inverted conical opening 112a maintain the individual movable members 114 most spaced from each other. Under this condition, the cap holder means 114 assumes its expanded condition. On the other hand, when the individual movable members 114 are pressed down against the resilience of the spring 122, the inner surface of the inverted conical opening 112a causes the movable members 114 to be driven toward each other against the resilience of the elastic member 141, whereby the cap holder means 113 assumes its shrunk condition.

In the present embodiment, a cap feeder which feeds the cap C to the cap holder means 113 is adapted to carry the cap C and to cap it forcibly upon the cap holder means 113 while causing a shrinkage of the cap holder means 113 which normally assumes its expanded condition, whereby the cap is held by the cap holder means 113. A cap feeder thus constructed is disclosed, for example, in U.S. Pat. No. 3,710,921.

Since forcing the cap holder means 113 down is effective to cause it to assume a shrunk condition in the present embodiment, a head retainer of a conventional capping head 131 which acts upon the cap C is directly utilized as an urging member 136.

Specifically, a down stroke of the capping head 131 is chosen to be longer than usual, so that when the cap C held by the cap holder means 113 is inserted into an opening 132a in the capping head 131 with its head abutting against the urging member 136, the head 131 continues to move down. When the cap holder means 113 is lowered through the cap C in this manner, the holder means 113 then assumes a shrunk condition to release its holding action upon the cap C.

Thereupon, a gripping member 132 of the capping head 131 is effective to grip the cap C. As in the previous embodiment, the capping head 131 is then able to grip the cap C without any influence upon the cap C from the cap holder means 113, allowing the cap C to be centered with respect to the capping head 131 when the latter is being gripped.

Figure 9:
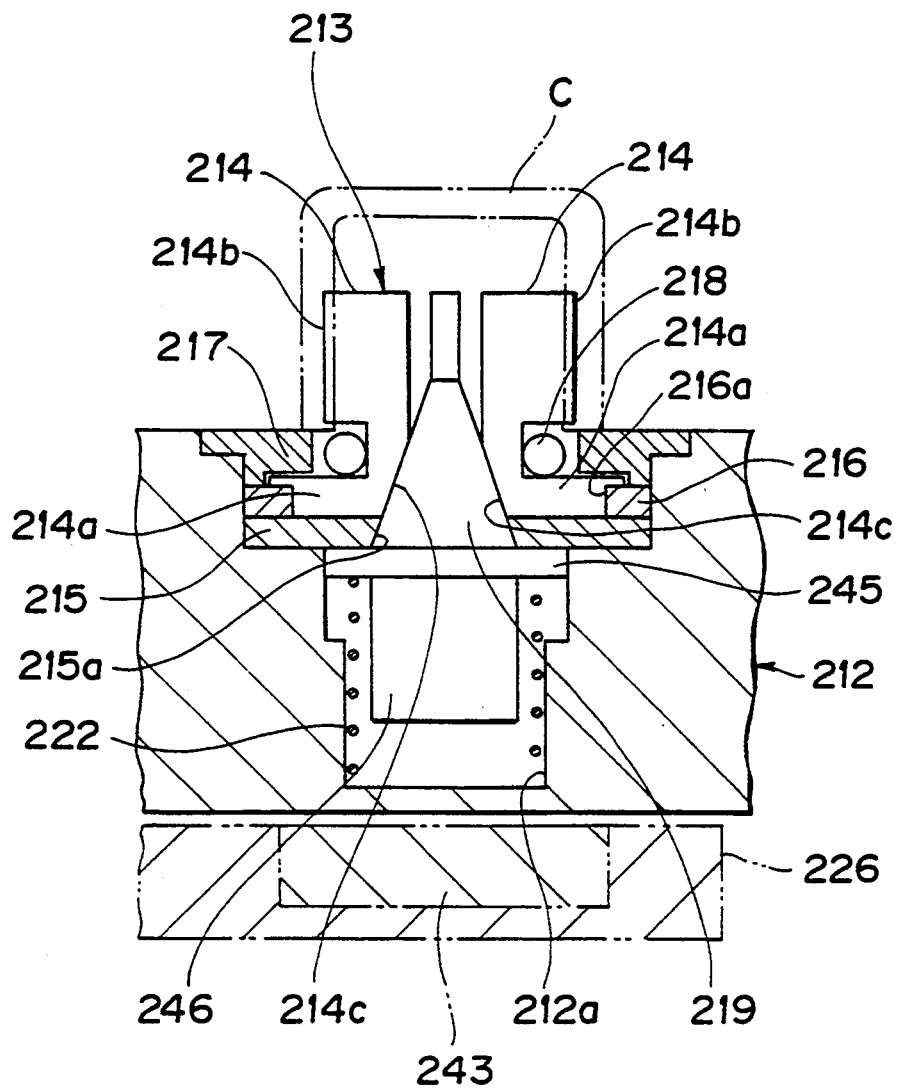
FIG. 9 is a cross section of a third embodiment of the invention.

FIG. 9 shows a third embodiment of the invention in which a magnet 243 is used to cause an expansion and shrinkage of cap holder means 213. Specifically, the cap holder means 213 includes four movable members 214, which are formed by circumferentially dividing a cylindrical member, having a flange as a slide 214a at its bottom, into four equal portions. The slide 214a of each movable member 214 is slidably placed on a fixing plate 215 which is mounted on a step of a stepped opening 212a formed in a rotatable member 212.

A ring-shaped guide plate 216 is placed on top of the fixing plate 215 as in the first embodiment, and acts to guide a radial reciprocating motion of the individual movable members 214. The fixing plate 215 and the guide plate 216 are secured to the rotatable body 212 by a ring-shaped lid 217 which is also secured to the rotatable body 212. In this manner, the lid 217 serves preventing the individual movable members 214 from being disengaged or moving upward away from the rotatable body 212.

Each movable member 214 includes a shank 214b, and a ring-shaped spring 218 is wrapped around the bottom of these movable members 214 in common, and the resilience of the spring 218 is effective to assemble the shanks 214b together, whereby the cap holder means 213 assumes its shrunk condition.

On the other hand, a conical cam member 219 extends through a guide opening 215a formed in the fixing plate 215 and is elevatably fitted within the stepped opening 212a formed in the rotatable body 212, and cam surfaces 214c formed on the bottom of the individual movable members 214 around their internal surface are resiliently urged against the peripheral surface of the cam member 219.

The bottom of the cam member 219 is integrally connected to a disc-shaped stop plate 245 which is effective to maintain the center of the cam member 219, which is elevatably fitted in the stepped opening 212a, at a fixed position. A spring 222 of a greater resilience than the spring 218 is disposed between the stop plate 245 and the rotatable body 212 to urge and normally maintain the cam member 219 at its elevated position against the resilience of the spring 218, whereby the movable members 214 assume their expanded condition presenting an outer diameter which is greater than the diameter of the inner peripheral surface of the cap C.

A cylindrical attraction member 246 formed of iron is integrally mounted on the lower surface of the stop plate 245, and is normally maintained at its upper position by the spring 222. However, during the rotation of the rotatable body 212 when the cap holder means 213 moves past a location above the magnet 243 which is disposed at a given location, the magnetic attraction of the magnet 243 attracts the attraction member 246 to its down position against the resilience of the spring 222.

As a consequence, the cam member 219 moves down integrally with the attraction member 246, whereby the individual movable members 214 are assembled together by the spring 218, and the cap holder means 213 assumes its shrunk condition presenting an outer diameter which is less than the diameter of the inner peripheral surface of the cap C. However, when the cap holder means 213 moves past the magnet 243, the influence of the magnet 243 is removed, whereupon the attraction member 246 and the cam member 219 return to their upper positions under the influence of the spring 222, whereupon the individual movable members 214 move open and the cap holder means assume its expanded condition presenting an outer diameter which is greater than the diameter of the inner peripheral surface of the cap C.

The magnet 243 is mounted on the fixing plate 226 over a zone which corresponds to the zone F shown above in connection with the first embodiment. Thus, the cap holder means 213 is maintained in its shrunk condition presenting a reduced outer diameter in this zone.

It will be evident that this arrangement again allows the cap C to be centered with respect to the cap holder means 213.

Figure 10:
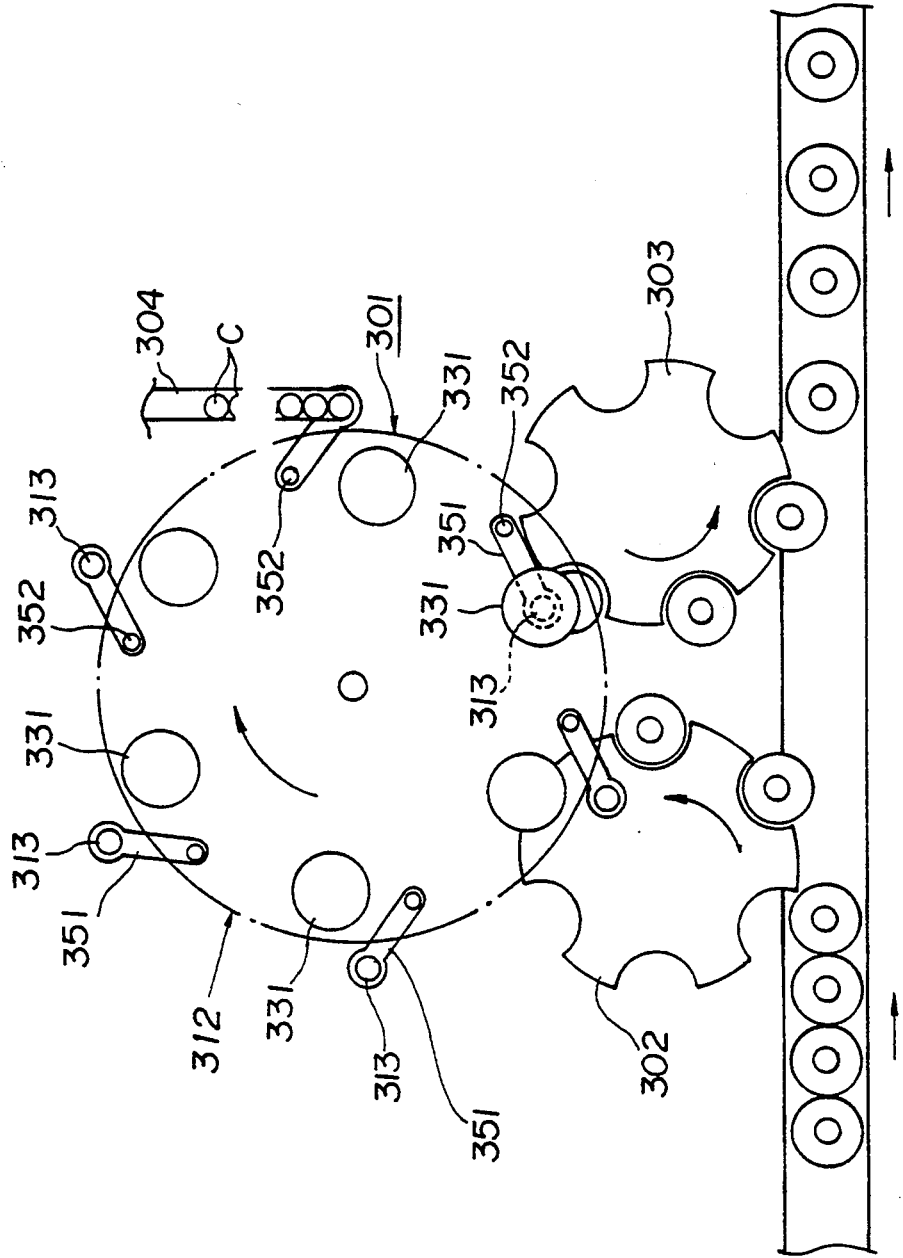
FIG. 10 is a schematic plan view of a fourth embodiment of the invention.
Figure 11:
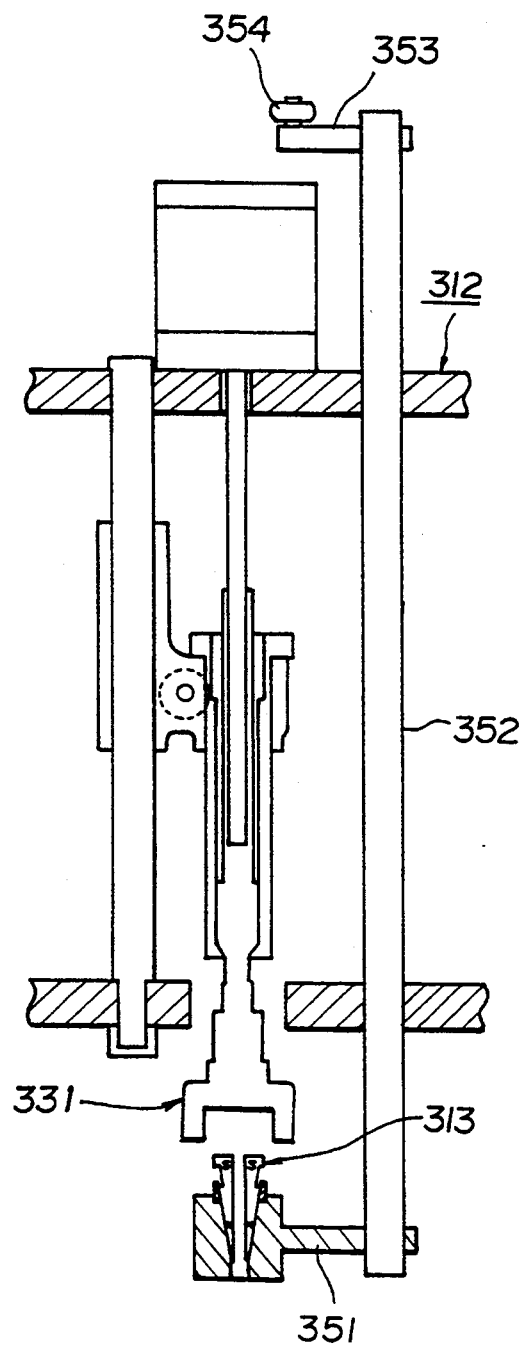
FIG. 11 is a cross section of an essential part of FIG. 10.

FIGS. 10 and 11 show a fourth embodiment of the invention. While the cap holder means has been mounted directly on the rotatable body in the previous embodiments, in the present embodiment, cap holder means 313 is mounted on the free end of a rocking arm 351 which is rockably mounted on a rotatable body 312, which itself constitutes a rotary capper.

Specifically, a rotary capper 301 which is used to apply a cap C to a vessel includes a rotatable body 312 which forms part of the rotary capper and which also forms part of a cap conveying unit. A plurality of capping heads 331 are elevatably mounted around the outer periphery of the rotatable body 312 at an equal circumferential spacing. A vessel is conveyed onto the rotatable body 312 through an inlet star wheel 302 at a location directly below the capping head 331, which then operates to apply the cap C to a vessel, which is in turn delivered out of the rotatable body 312 through an outlet star wheel 303.

Figure 12:
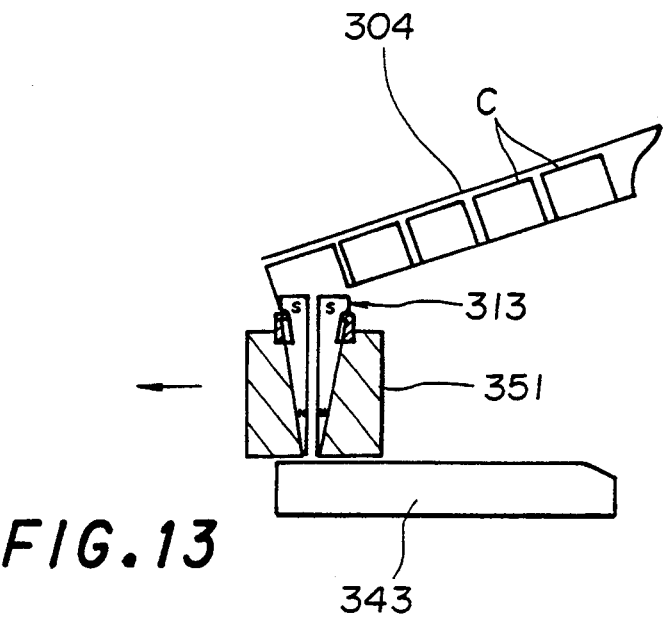
FIG. 12 is a cross section of the free end portion of a chute 304 shown in FIG. 10.

A plurality of shafts 352 are rotatably mounted on the rotatable body 312 adjacent to the respective capping heads 331, and each shaft 352 carries on its bottom one end of the rocking arm 351, the free end or the other end of which has cap holder means 313 mounted thereon. As shown in FIG. 11, a cam lever 353 is mounted on the top end of each shaft 352. The cam lever 353 carries a cam follower 354, which is in turn engaged with a fixed cam, not shown, whereby the rocking arm 351 rocks about the shaft 352 as the rotatable body 312 rotates, thus allowing the cap holder means 313 to move between a position directly below the capping head 331 shown in FIG. 10 and another position (see FIG. 12) directly below a chute 304, serving as a cap feeder, located outside the rotatable body 312.

Figure 13:
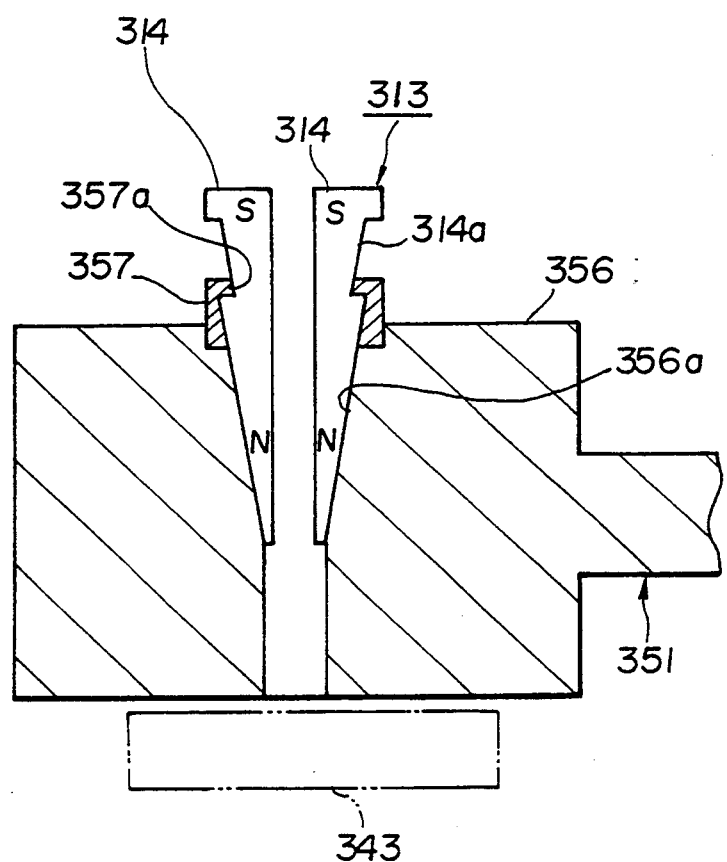
FIG. 13 is a cross section of the free end portion of a rocking arm 351 shown in FIG. 10.
Figure 14:
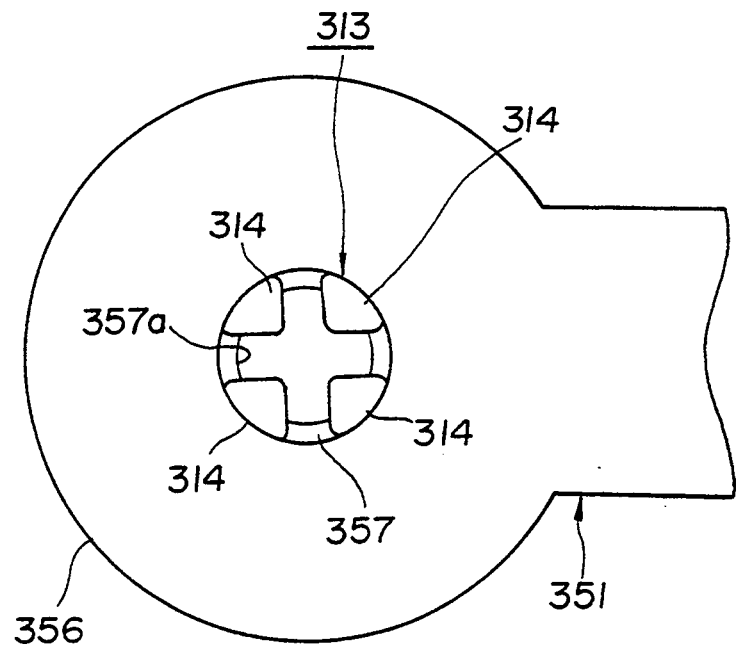
FIG. 14 is a plan view of FIG. 13.

The cap holder means 313 used in the present embodiment is illustrated in FIGS. 13 and 14. As shown, it includes four movable members 314, which are formed as four equal portions circumferentially divided from an inverse conical magnet. Each movable member 314 is elevatably fitted in an inverse conical cam opening 356a formed in a cylindrical support block 356 which is formed on the free end of each rocking arm 351. The magnets which form the individual movable members 314 are of like polarity, and the force of repulsion acting therebetween serves moving the movable members 314 away from each other, whereby they are located at an elevated end along an inclined surface formed around the cam opening 356a. A ring-shaped stop member 357 is mounted in the opening of the cam opening 356a, and is formed, at its top end, with a stop 357a which projects radially inward for engagement with a groove 314a formed in the outer peripheral surface of the movable member 314 at a given location and to define a given extent, within which the movable member 314 is allowed to move up and down.

When the movable members 314 are located at their elevated positions, they assume an expanded condition presenting an outer diameter which is greater than the diameter of the inner peripheral surface of the cap. By contrast, when the movable members 314 are attracted by a magnet 343 (see FIG. 12) of dissimilar polarity disposed below the chute 304, the individual movable members 314 are forced down against the force of repulsion acting therebetween and thus move toward each other along the cam opening 356a, whereby the movable members 314 assume a shrunk condition presenting an outer diameter which is less than the diameter of the inner peripheral surface of the cap.

In the present embodiment, when the movable members 314 assume their shrunk positions, these movable members 314 are displaced downwardly of the position assumed by the same movable members when they are in their expanded conditions, so that a disengagement of the cap from the movable members 314 is greatly facilitated than in an arrangement when the individual movable members are located at the same elevation when expanding or shrinking.

FIGS. 15 to 23 illustrate a fifth embodiment of the invention in which cap holder means are mounted on separate holders, each of which is conveyed by conveying means along a circulating path.

Figure 15:
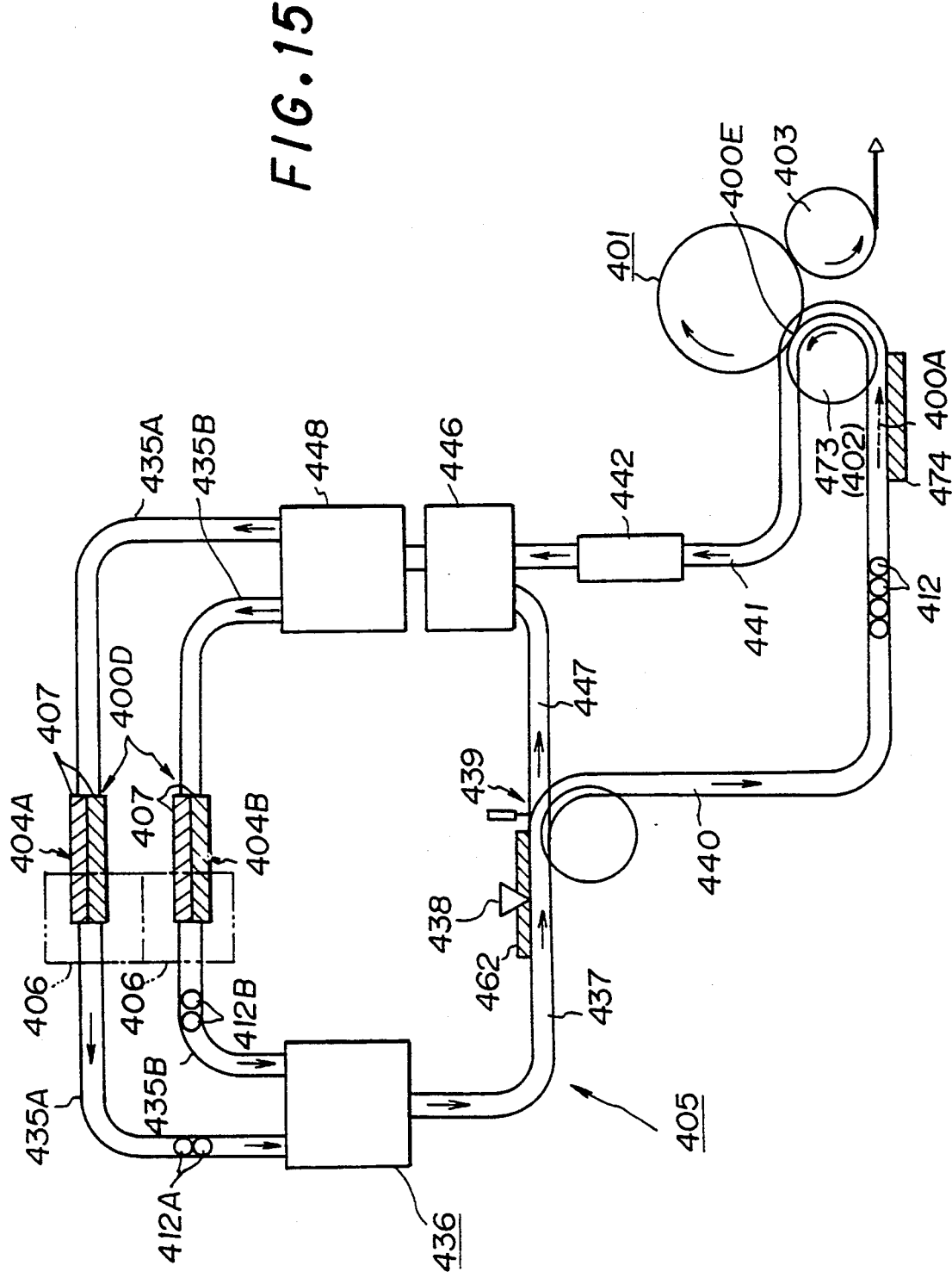
FIG. 15 is a schematic plan view of a fifth embodiment of the invention.

Specifically, referring to FIG. 15, a rotary capper 401 which applies a cap to a vessel includes an inlet star wheel 402 and an outlet star wheel 403. A vessel is conveyed in the direction of an arrow 400A by a conveyor, not shown, and is handed to the capper 401 through the inlet star wheel 402. A capped vessel is delivered out of the cap 401 through the outlet star wheel 403.

A cap conveying unit 405 which supplies a cap to the capper 401 includes a pair of cap feeders 404A, 404B which are juxtaposed to each other in the embodiment shown. Each of the cap feeders 404A, 404B includes a hopper 406, a feed screw 407, and an attraction wheel 408 (see FIG. 16).

Figure 16:
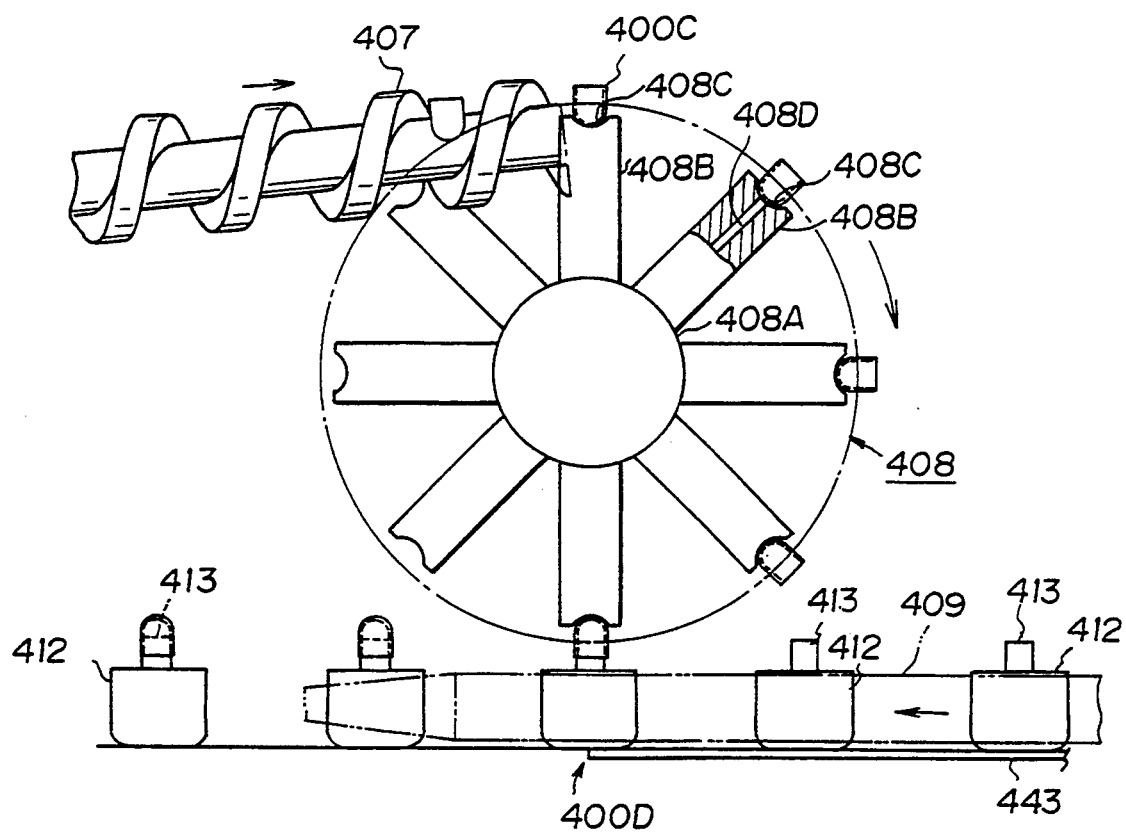
FIG. 16 is a front view of an essential part of a cap feeder shown in FIG. 15.

Referring to FIG. 16, a cap 400C is generally cylindrical in configuration with a semi-spherical head and is dropped between a pair of juxtaposed feed screws 407, which are driven for rotation in opposite directions to each other and in synchronism with each other. While the cap 400C is being conveyed as straddled across the pair of feed screws 407, it assumes an inverted position in which the heavy head is directed downward, and is conveyed in a sequential manner at a given spacing therebetween. Conveying means which utilizes such feed screws is known and disclosed in Japanese Laid-Open Patent Application No. 249,016/1991 or U.S. Pat. No. 3,710,921.

The attraction wheel 408 comprises a horizontal rotary shaft 408A which is driven for rotation in synchronism with the rotation of the feed screws 407, a plurality of attracting rods 408B extending radially from the rotary shaft 408A at an equal angular spacing, a semispherical recess 408C formed in the free end of each attracting rod 408B, and a negative pressure passage 408D formed in the axial portion of each attracting rod 408B. A negative pressure within the passage 408D is effective to attract the head of the cap 400C which is fed to each recess 408C from the feed screws 407 for supporting it.

The cap 400C which is held attracted to the free end of each attracting rod 408B is reversed from its inverted position to an erect position by the rotation of the rotary shaft 408A, and is sequentially supplied to cap holder means 413 mounted on a separate holder 412. The individual holders 412 are conveyed independently from each other, but are synchronized with the rotation of the attraction wheel 408 at the cap receiving position 400D where caps are received from the cap feeders 404A, 404B, by means of a timing screw 409.

A communication of the negative pressure passage 408D formed within the attracting rod 408B with a source of negative pressure is interrupted when the cap 400C attracted by the rod 408B is inserted into the cap holder means 413, whereupon the cap 400C is handed to the cap holder means 413, which is then conveyed by the holder 412 while holding the inner peripheral surface of the cap 400C.

Figure 17:
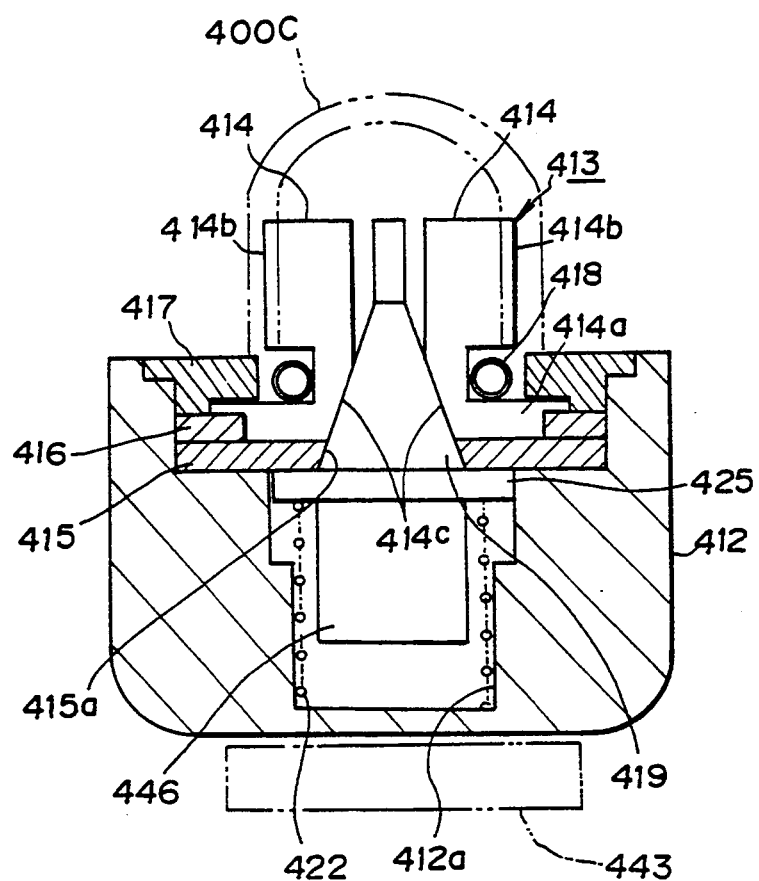
FIG. 17 is a cross section, to an enlarged scale, of a holder 412 shown in FIG. 15.
Figure 18:
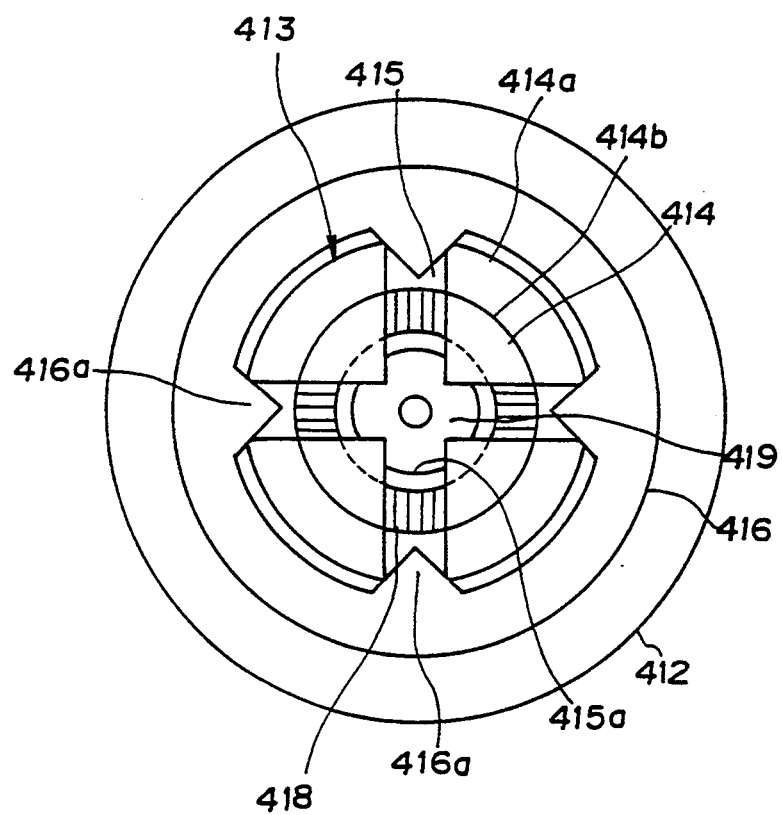
FIG. 18 is a plan view of FIG. 17 from which a lid 417 is omitted.

FIGS. 17 and 18 show the cap holder means 413 and holder 412 in detail. The cap holder means 413 used in the present embodiment is constructed in substantially the same manner as the cap holder means 213 shown in FIG. 9. The difference between the arrangement of FIGS. 17 and 18 and FIG. 9 lies in the fact that whether the cap holder means is mounted on the rotatable body 212 or in the cylindrical holder 412. Accordingly, except for the reference character 400C used to designate the cap, parts shown in FIGS. 17 and 18 which correspond to like parts shown in FIG. 9 are designated by like numerals as used in FIG. 9 to which 200 is added, and they will not be described in further detail.

As shown in FIG. 16, a magnet 443 which is used to shrink the outer diameter of the cap holder means 413 is located at the cap receiving position 400D where the cap 400C is received from the cap feeders 404A, 404B. Specifically, at the cap receiving position 400D, the holder 412 is driven for movement in synchronism with the rotation of the attraction wheel 408 by means of the timing screw 409, and when the free end of the attracting rod 408B is directed substantially vertically downward, the cap 400C held attracted by the rod 408B is fitted over the top end of the shanks 414B of the movable members 414 which form the cap holder means 413. Accordingly, the magnet 443 extends from the position where the free end of the attracting rod 408B is directed vertically downward toward the upstream side along the path of travel of the holder 412.

Consequently, before the cap 400C is handed from the rod 408B to the cap holder means 413, the magnet 443 is effective to cause a shrunk condition of the cap holder means so that an outer diameter presented by the combined shanks 414B is reduced, and when the cap 400C is handed from the rod 408B to the cap holder means 413, the holder 412 then immediately moves past the magnet 443, whereby the cap holder means 413 assume an expanded condition, presenting an increased diameter. Consequently, the inner peripheral surface of the cap 400C is engaged by the combined outer peripheral surfaces of the individual shanks 414, and the cap 400C is centered over the shanks 414B regardless of any change in the internal diameter of the cap.

Returning to FIG. 15, a holder 412A which has received a cap from one of the cap feeders, 404A, at the cap receiving position 400D is conveyed on a first branch path 435A to a first collector 436 while another holder 412B which has received a cap from the other cap feeder 404B is conveyed on a second branch path 435B to the same first collector 436. The individual holders 412 are merged into one row by the first collector 436, and is then conveyed on a supply path 437 to pass by a cap checker 438 which detects the presence or absence of a cap on each holder.

A rejector 439 is disposed downstream of the cap checker 438. A normal holder carrying a cap passes through the rejector 439 and is then conveyed on a supply path 440 to the cap delivery position 400E disposed above the inlet star wheel 402 of the capper 401. When a cap is handed from the holder 412 to a capping head on the capper 401A at the cap delivery position 400E, the holder is then conveyed on a discharge path 441 to enter a reverser 442. The purpose of the reverser 442 is to remove a cap from any holder whenever the delivery of a cap from the holder to the capping head has failed and the cap remains on the holder. After passing through the reverser 442, the empty holder is conveyed into a second collector 446.

On the other hand, any holder which failed to receive a cap at the cap receiving position 400D, or an empty holder carrying no cap is discharged by the rejector 439 to a reject path 447 by being diverted away from the normal supply path 437, and is then conveyed on the path 447 to be directly fed into the second collector 446, thus bypassing the cap delivery position 400E. The purpose of the second collector 446 is to merge the holders from the reverser 442 and from the reject path 447 into one row, which is then fed to a branch unit 448. The branch unit 448 divides the holders supplied in one row from the second collector into two rows, each fed through a first branch path 435A and a second branch path 435B, for circulation to the cap feeders 404A and 404B, respectively.

Figure 19:
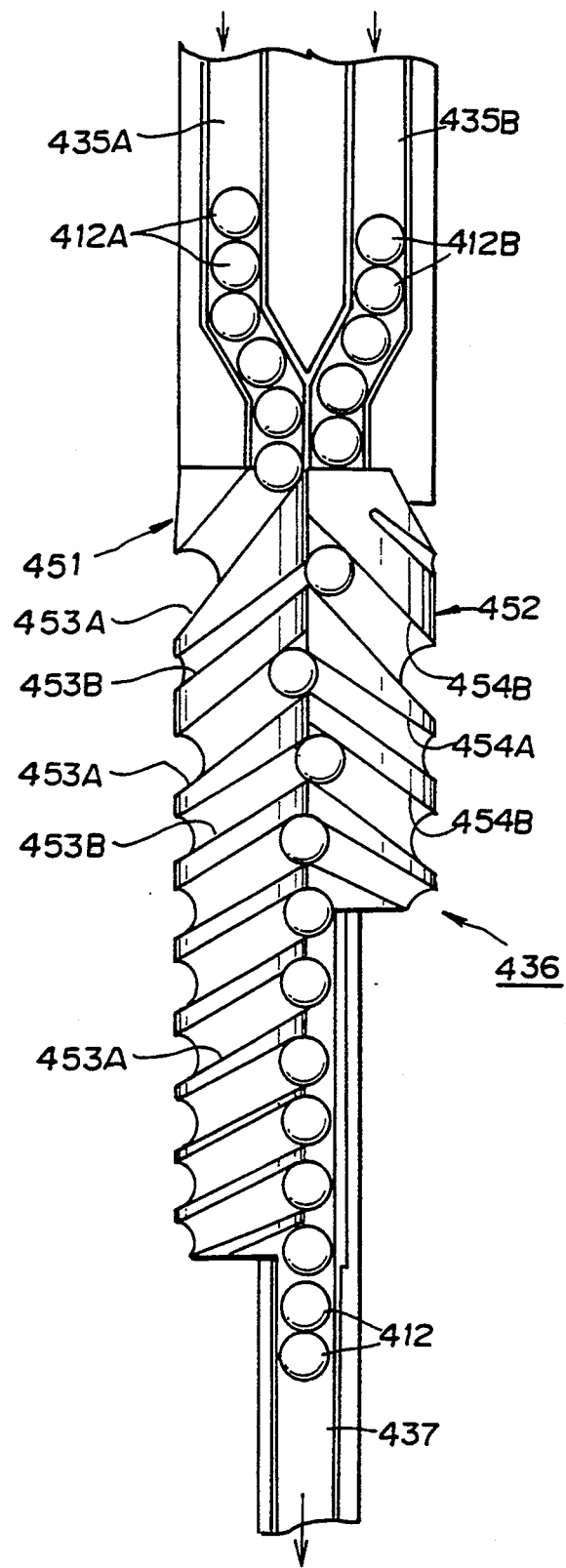
FIG. 19 is an enlarged plan view of a collector 436 shown in FIG. 15.

FIG. 19 shows the construction of the first collector 436 specifically. Thus, the collector 436 includes a pair of parallel screws 451, 452 which are disposed adjacent to each other and which are driven for rotation in opposite directions, but in synchronism with each other. The screw 451 is peripherally formed with a helical groove 453A which receives a holder 412A from the first branch path 435A therein, and another helical groove 453B disposed intermediate the helical grooves 453A. The other screw 452 is peripherally formed with a helical groove 454B which receives a holder 412B from the second branch path 453B, and another helical groove 454A disposed intermediate the helical grooves 454B.

The helical grooves 453A and 454B of the screws 451, 452 are 180° out of phase with each other, thus permitting the holder 412A from the first branch path 435A to be introduced into the helical groove 453A in alternate fashion with the holder 412B from the second branch path 453B which is introduced into the helical groove 454B. The helical groove 453B disposed intermediate the helical grooves 453A into which the holder 412A is introduced is formed to cooperate with the helical groove 454B formed in the other screw 452 so that the combination of the both grooves 453B, 454B is effective to move the holder 412B along the center between the pair of screws 451, 552 while holding it sandwiched from the both sides. In this manner, the holder 412B can be centered with respect to the supply path 437.

Similarly, the helical groove 454A disposed intermediate the helical grooves 454B into which the holder 412B is introduced is formed to cooperate with the helical groove 453A of the other screw 451 so that the combination of the both grooves 453A, 454A is effective to move the holder 412A along the center between the pair of screws 451, 452, thus allowing the holder 412A to be centered with respect to the supply path 437. In this manner, the holders 412A, 412B from the branch paths 435A, 435B are alternately merged together into one row during their passage through the first collector 436 before they are delivered to the supply path 437.

The second collector 446 is similarly constructed as the first collector 436. Since the branch unit 448 is only required to rotate the screws 451, 452 of the first collector 436 in opposite directions, its construction will not be specifically described. It is to be noted however that the collectors 436, 446 and the branch unit 448 is not limited to the specific configuration shown in FIG. 19, but that a conventional arrangement of the same kind can also be utilized.

Figure 20:
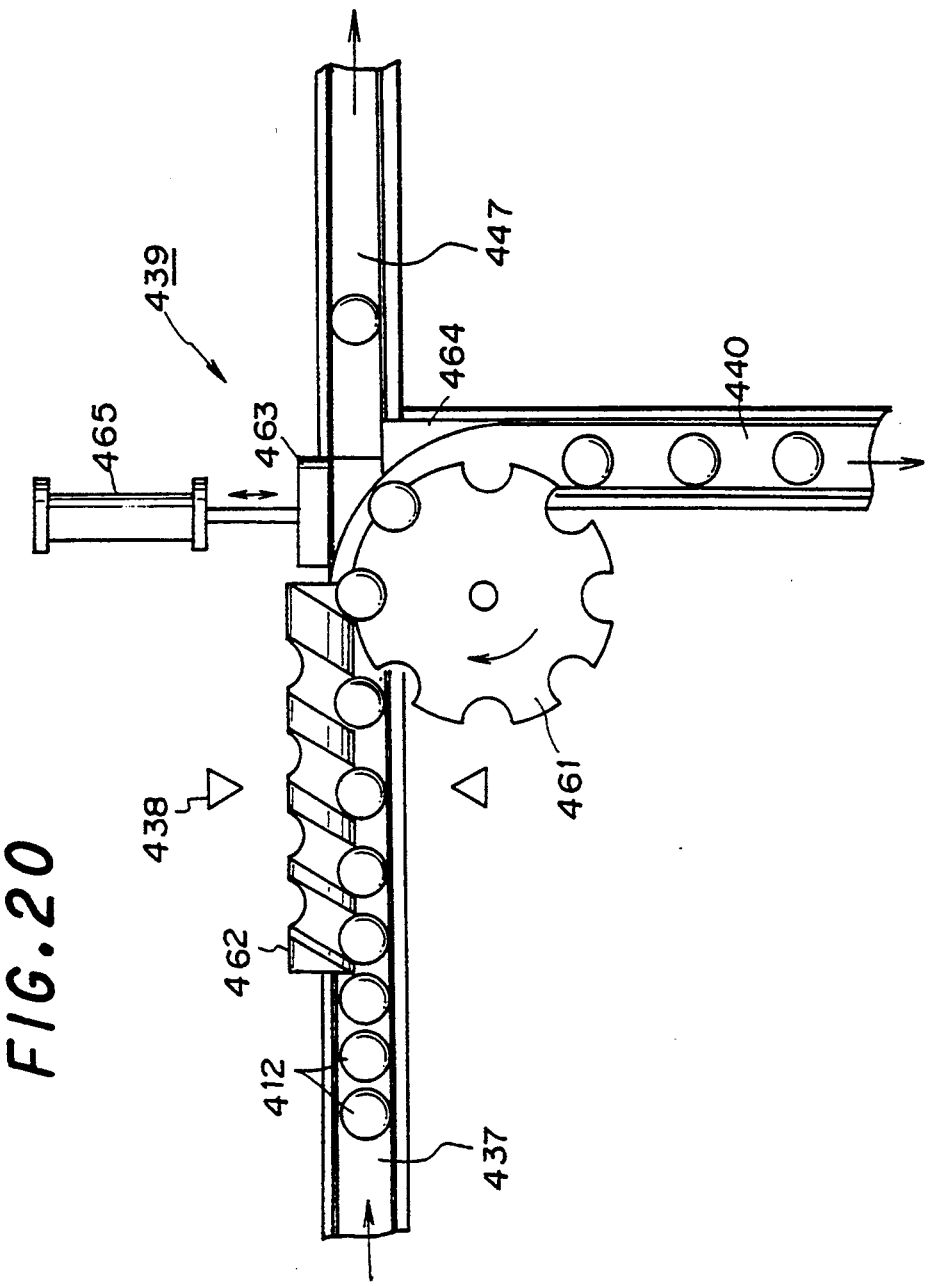
FIG. 20 is an enlarged plan view of a reject unit 439 shown in FIG. 15.

Referring to FIG. 20, the reject path 447 is disposed in line with the supply path 437, and the supply path 440 is connected to the junction between the supply path 437 and the reject path 447 and extends perpendicular thereto. The rejector 439 comprises a star wheel 461 disposed inside a corner defined between the supply paths 437, 440 which are disposed perpendicular to each other, and a timing screw 462 disposed on the other side of the supply path 437 in opposing relationship with the star wheel 461 and extending therefrom in the upstream direction. The timing screw 462 allows the holder 412 which is conveyed on the supply path 437 to be synchronized with the rotation of the star wheel 461.

A movable guide 463 and a fixed guide 464 are sequentially disposed along the circumference of the star wheel 461 at a point downstream of the timing screw 462, and the movable guide 463 can be operated by an air cylinder 465 to move a position located adjacent to the star wheel 461 and another position which is removed therefrom.

The air cylinder 465 is operated by a signal from the cap checker 438 which detects the presence or absence of the cap, and under normal condition when the holder 412 is supplied with the cap, the movable guide 463 is held in its position located adjacent to the star wheel 461. Under such condition, the holder 412 which is handed from the timing screw 462 to the star wheel 461 is guided by the movable guide 463 and the fixed guide 464 to be handed to the supply path 440 as the star wheel 461 rotates.

By contrast, when the cap checker 438 detects that the present holder 412 is not supplied with the cap, the air cylinder 465 operates to move the movable guide 463 to its position removed from the star wheel 461. Thereupon, the holder 412 which is handed from the timing screw 462 to the star wheel 461 is expelled radially outward of the star wheel 461 as it rotates, whereby it is discharged into the reject path 447.

Figure 21:
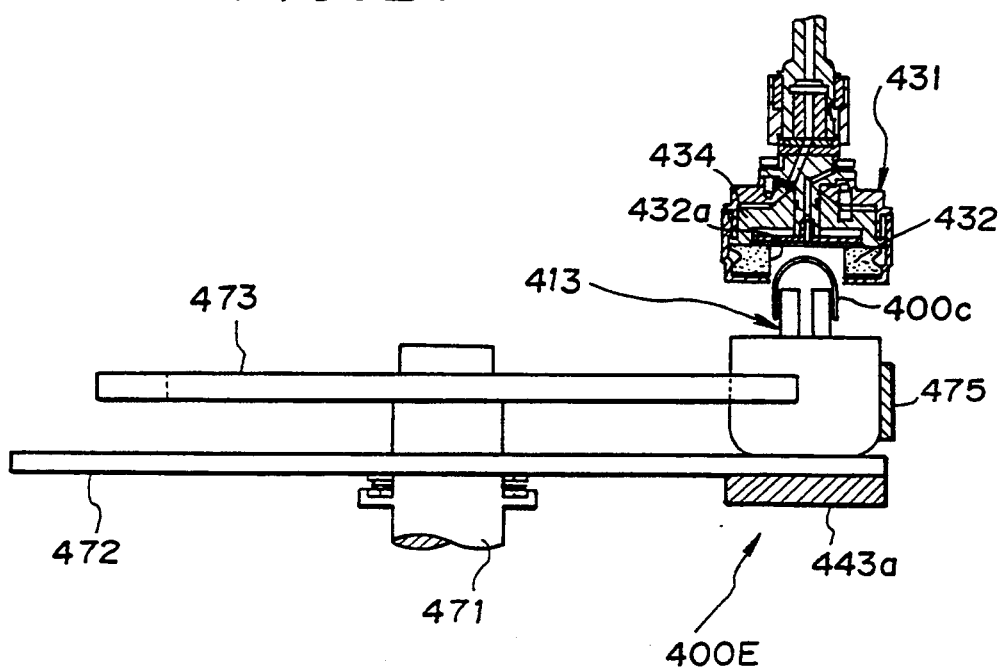
FIG. 21 is a cross section of a cap delivery location 400E shown in FIG. 15.

As mentioned previously, the holder 412 which is supplied with the cap is conveyed on the supply path 437, around the rejector 439 and on the supply path 440 to be conveyed into the cap delivery position 400E which is disposed above the inlet star wheel 402 of the capper 401. FIG. 21 is a schematic illustration of the cap delivery position 400E. Specifically, a drive shaft 471 vertically extends through a fixed plate 472 and is rotatably journalled therein. A star wheel 473 for conveying the holder 412 is mounted on a portion of the drive shaft 471 which projects above the fixed plate 472. While not shown, the drive shaft 471 is also capable of driving the inlet star wheel 402 for rotation, which is located therebelow.

The holder 412 which is conveyed on the supply path 440 in the manner illustrated in FIG. 15 is handed to the star wheel 473 and synchronized therewith by the timing screw 474, and is then conveyed along an arcuate fixed guide 475 above the fixed plate 472 to be synchronized with a capping head 431 of the rotary capper 401.

The capping head 431 is provided with a gripping member 432, a receiving opening 432a and a piston 434 in the similar manner as the capping head 31 mentioned previously.

A magnet 443a, which is separate from the magnet 443 mentioned above is mounted on the fixed plate 472 at the cap delivery position 400E where the capping head 431 receives the cap 400C from the cap holder means 413 on the holder 412, and is operative to reduce the outer diameter of the cap holder means 413 immediately after the capping head 431 is lowered to have the cap 400C inserted into its central opening 432a.

When the cap 400C is inserted into the opening 432a of the gripping member 432 and the outer diameter of the cap holder means 413 is reduced, the gripping member 432 is immediately subject to an elastic deformation, caused by the action of the piston 434, to grip the outer periphery of the cap 400C firmly. Thereupon, the capping head 431 can grip the cap 400C, free from the influence of the cap holding action by the cap holder means 413, and accordingly the cap 400C can be centered with respect to the capping head 431.

When the capping head 431 gripping the cap 400C is raised and the cap 400C is completely disengaged from the cap holder means 413, the holder 412 is then carried past the magnet 443a by the rotation of the star wheel 473, and accordingly the cap holder means 413 is returned to its expanded condition presenting an increased outer diameter.

Figure 22:
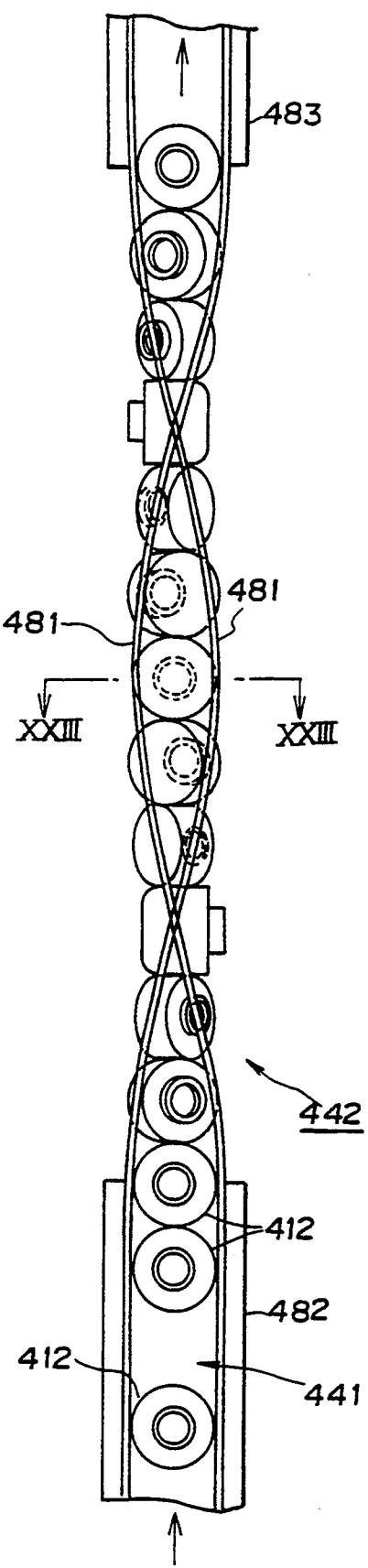
FIG. 22 is an enlarged plan view of a reverser 442 shown in FIG. 15.
Figure 23:
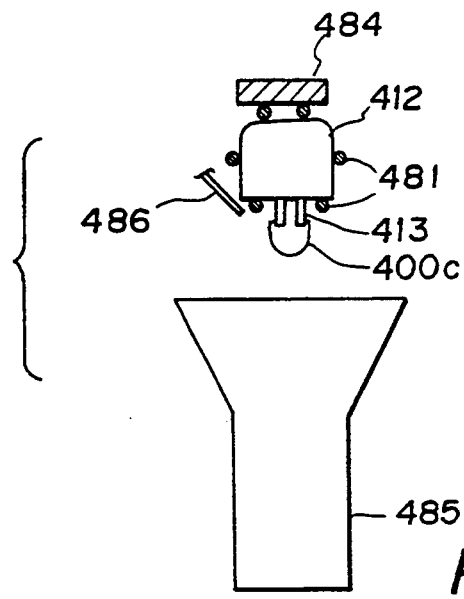
FIG. 23 is a cross section taken along the line XXIII—XXIII shown in FIG. 22.

As mentioned above, the purpose of the reverser 442 is to remove the cap 400C from the holder 412 when the delivery of the cap 400C from the holder 412 to the capping head 431 failed and the cap 400C remains on the holder 412. Referring to FIGS. 22 and 23, the reverser 442 includes a plurality of twisted guides 481, which are operative to reverse the holder 412 by rotating it through 180° and then continues to rotate it through another 180° to return to its original position while feeding the holder 412 in one direction. Parts of the twisted guides are omitted from illustrated in FIG.

22, but as shown in FIG. 23, the twisted guides 481 are capable of supporting the bottom surface, the top surface and the lateral sides of the holder 412.

As shown in FIG. 22, the discharge path 441 is provided with a pair of conveyors 482, 483 for conveying the holder 412, but the conveyor is omitted from illustration in a region where the twisted guides 481 operate to rotate the holder 412. The arrangement is such that the forward drive of the holders 412 which are being conveyed by the upstream conveyor 482 is effective to cause the individual holders 412 to pass through the twisted guide 481 in succession.

Referring to FIG. 23, a magnet 484 is disposed so as to be located adjacent to the bottom of the reversed holder 412 in a region where the holder 412 is to be reversed. The outer diameter of the cap holder means 413 can be reduced under the magnetic influence of the magnet 484. Accordingly, the cap 400C, which has been held in place by the engagements of its inner peripheral surface with the cap holder means 413 having an increased outer diameter, falls by gravity as the outer diameter of the cap holder means 413 is reduced, to be recovered by a cap recovery station 485 located therebelow. At this time, an air nozzle 486 blows air toward the cap 400C, thus assuring a reliable disengagement of the cap 400C from the cap holder means 413.

Figure 24:
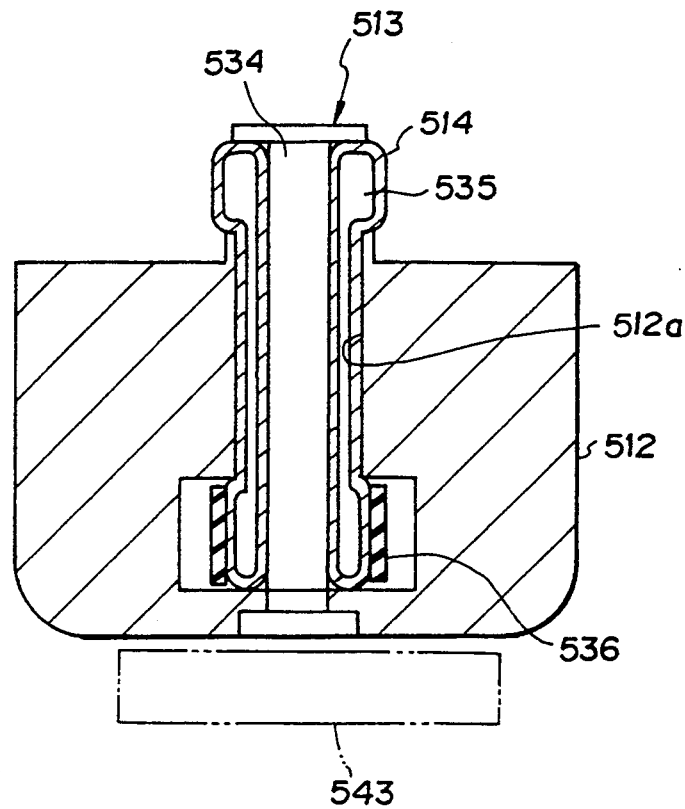
FIG. 24 is a cross section of a holder according to a sixth embodiment of the invention.

FIG. 24 shows another embodiment of cap holder means 513, comprising a stanchion 534 fixedly mounted centrally in a stepped opening 512a formed in a holder 412, a bag-shaped movable member 514 formed of an elastic material which is wrapped around the stanchion, and magnetic fluid 535 which is sealingly confined within the movable member 514.

An intermediate portion of the movable member 514 is supported by the inner peripheral surface of the stepped opening 512 in order to prevent it from bulging radially outward, but the upper and lower ends of the movable member 514 is allowed to bulge radially outward. The bottom of the movable member is clamped by a band 536 of an elastic material, thus normally causing the upper end to bulge radially outward.

Under this condition, the upper end of the movable member 514 presents an outer diameter which is greater than the diameter of the inner peripheral surface of the cap, and thus assumes an expanded condition. By contrast, when the magnetic fluid 535 sealed in the movable member 514 is attracted by the magnet 543, the magnetic fluid 535 is driven downward within the movable member 514 against the clamping force of the band 536, whereby the outer diameter of the upper end of the movable member 514 can be reduced less than the diameter of the inner peripheral surface of the cap, thus assuming a shrunk condition.

Figure 25:
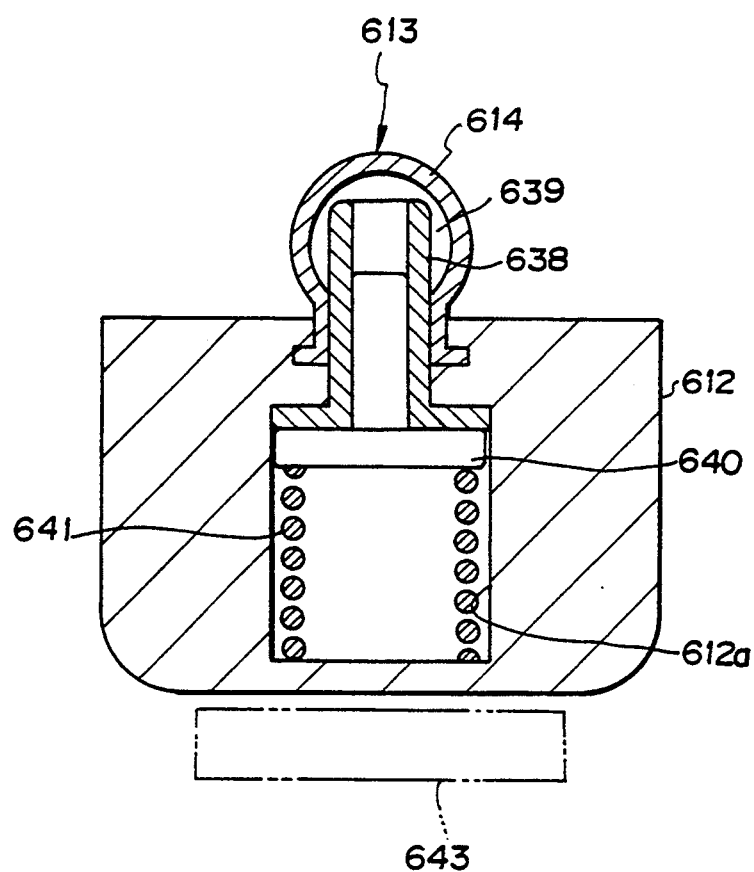
FIG. 25 is a cross section of a holder according to a seventh embodiment of the invention.

FIG. 25 shows another embodiment of cap holder means 613. In this embodiment, the cap holder means 613 comprises a cylinder 638 mounted in the upper opening of a stepped opening 612a formed in a holder 612, a spherical movable member 614 formed of an elastic material which covers the top opening of the cylinder 638 in a sealing manner, and silicone oil 639 which is sealingly confined within the movable member 614. A piston 640 formed of iron is elevatably fitted in the cylinder 638, and is normally maintained at its elevated end position by a spring 641.

Under normal condition when the piston 640 is maintained at its elevated end position, the movable member 614 bulges radially outward due to the presence of the silicone oil 639 therein, thus assuming an expanded condition, presenting an outer diameter which is greater than the diameter of the inner peripheral surface of the cap. By contrast, when the piston 640 is attracted by the magnet 643 against the resilience of the spring 641 to move down, the silicone oil 639 is withdrawn into the cylinder 638, whereby the outer diameter of the movable member 614 is reduced to be less than the diameter of the inner peripheral surface of the cap, thus assuming a shrunk condition.

Figure 26:
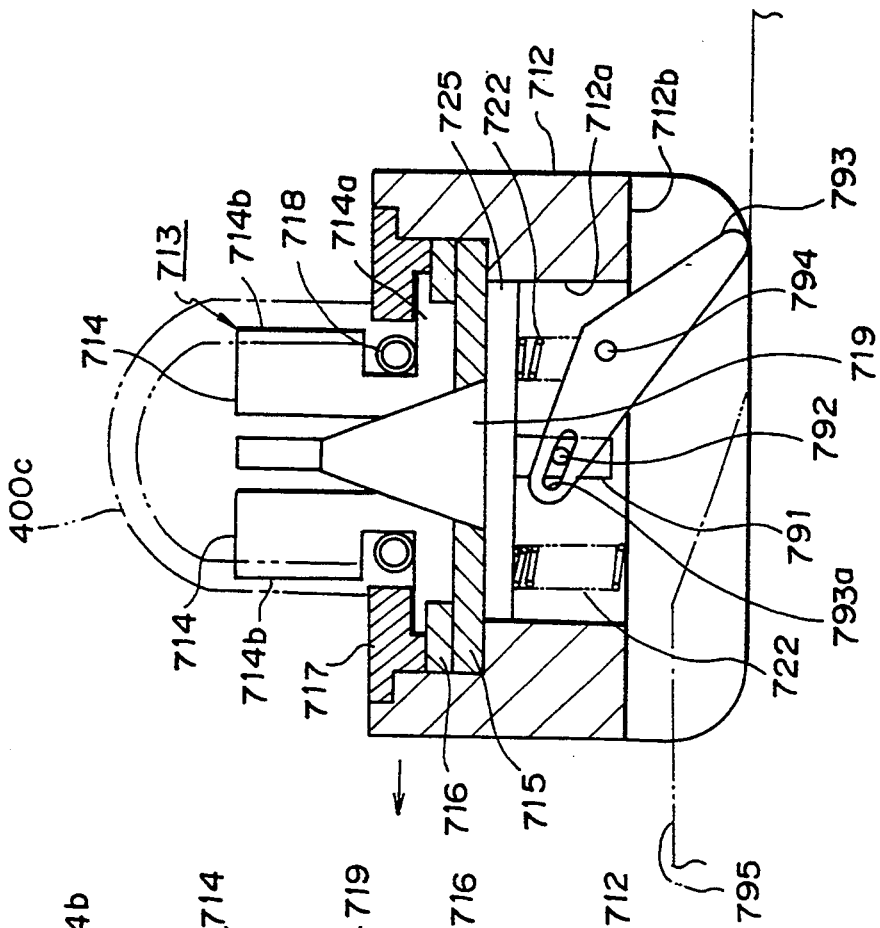
FIG. 26 is a cross section of a holder according to an eighth embodiment of the invention.
Figure 27:
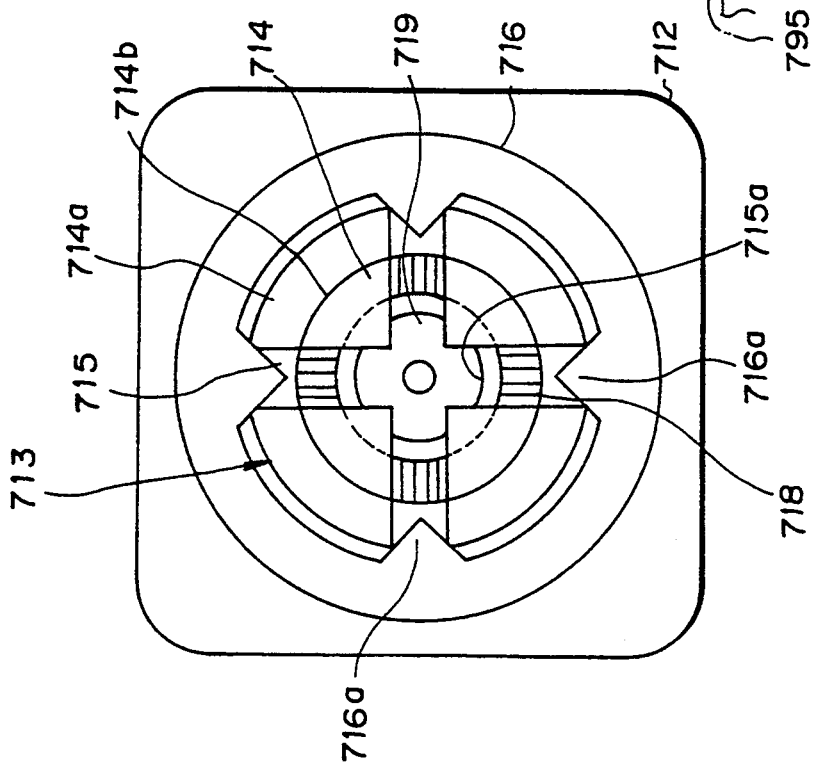
FIG. 27 is a plan view of FIG. 26 from which a lid 717 is omitted.

FIGS. 26 and 27 show a further embodiment of cap holder means. In this embodiment, cap holder means 713 includes movable members 714 which are expanded and shrunk by a cam mechanism rather than by a magnet. The cap holder means 713 of this embodiment is essentially similarly constructed as the fifth embodiment (shown in FIGS. 15 to 23), and accordingly corresponding parts are designated by like numerals as used in the description of the fifth embodiment, to which 300 is added so that every part is designated by a reference numeral on the 700 level, except for the cap 400C.

In this embodiment, a holder 712 is prism-shaped so that it can be conveyed along a guide member of conveying means, not shown, while being oriented in a given direction. The bottom of the holder 712 is formed with a slit 712b of a width narrower than the internal diameter of a stepped opening 712a and continuing to the lower portion of the opening 712a, the slit extending in the direction of conveyance.

The movable members 714 are expanded or shrunk by a conical cam member 719 having a rod 791 mounted on its bottom, with a pin 792 mounted on the rod and engaging an elongate slot 793a formed in one end of a triangular cam lever 793. At its intermediate portion, the cam lever 793 is rockably connected to the holder 712 by a pin 794 at a position located rearward, as viewed in the direction in which the holder 712 is conveyed, of the rod 791. The other end of the cam lever 793 extends rearwardly, as viewed in the direction of conveyance, of the pin 794 and extends obliquely downward across the slit 712b.

In this embodiment, a plurality of springs 726 are disposed between the bottom of the stepped opening 712a and the cam member 719 and are located so as to avoid interference with the slit 712b and the cam lever 793 for urging the cam member 719 upward. When the resilience of these springs 726 overcomes the resilience of another spring 718 to maintain the cam member 719 at its elevated end position, the lower end of the cam lever 793 is substantially flush with the bottom surface of the holder 712. When the cam member 719 is maintained at its elevated end position, the movable members 714 are driven radially outward by the cam member 719 to assume an expanded condition, presenting an outer diameter which is greater than the diameter of the inner peripheral surface of the cap 400C, in the similar manner as in the fifth embodiment.

In the present embodiment, the magnet mentioned previously is replaced by a cam member 795 which is fixedly mounted at the position where the magnet was disposed for engagement with the cam lever 793. As the holder 712 moves forward, the cam member 795 relatively moves into the slit 712b to engage the lower end of the cam lever 793, causing it to rotate counter-clockwise, as viewed in FIG. 26, about the pin 794. This acts through the rod 791 to force the cam member 719 down, whereby the individual movable members 714 are assembled together under the influence of the spring 718 to assume a shrunk condition in which an outer diameter depicted by shanks 714b thereof is less than the diameter of the inner peripheral surface of the cap 400C.

Figure 28:
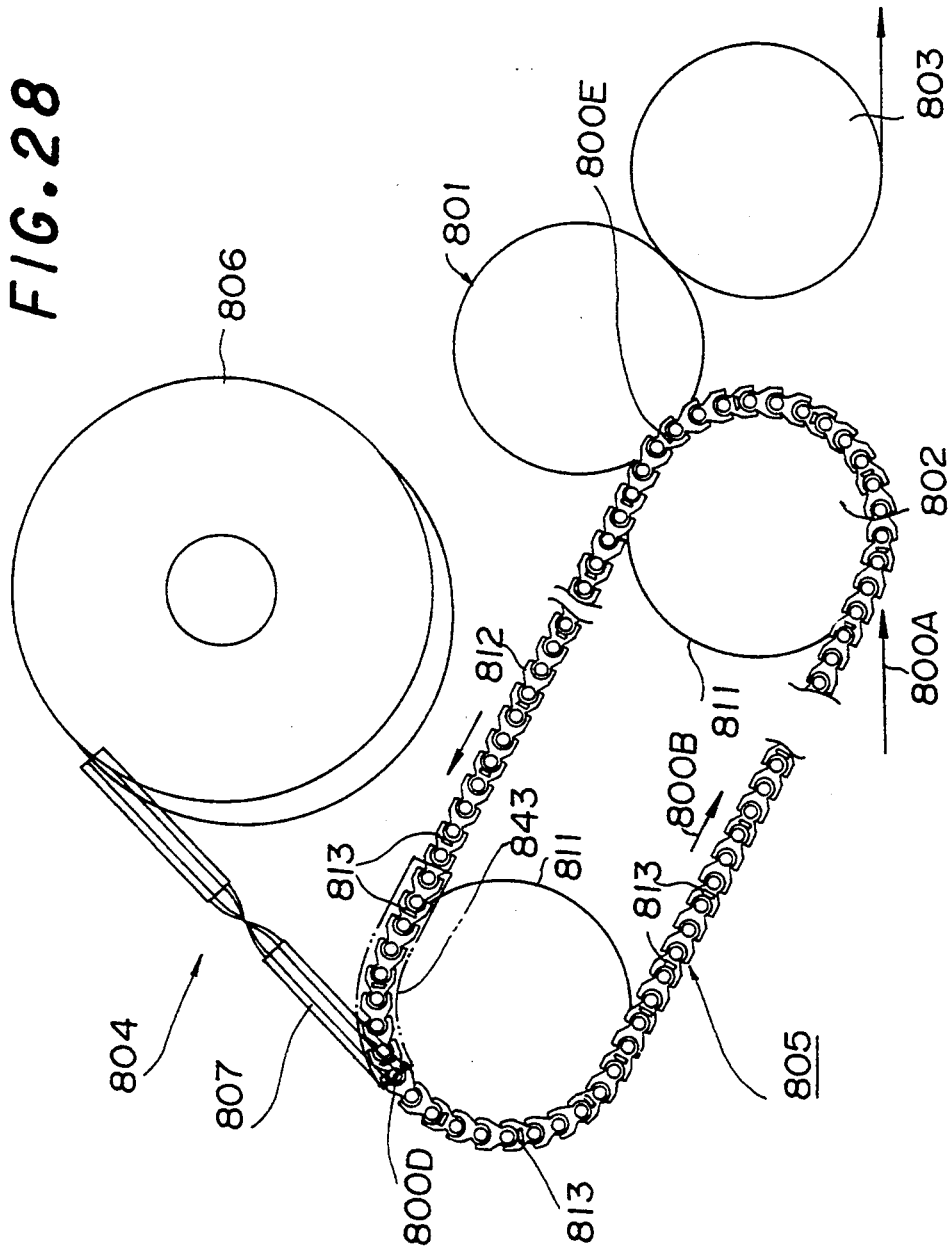
FIG. 28 is a schematic plan view of a ninth embodiment of the invention.

FIGS. 28 to 31 show a ninth embodiment of the invention. Referring to FIG. 28, a rotary capper 801 which applies a cap to a vessel comprises an inlet start wheel 802 and an outlet star wheel 803. A vessel is conveyed, by a conveyor, not shown, in the direction indicated by an arrow 800A to be handed by the inlet star wheel 802 onto the capper 801. A capped vessel is conveyed by the capper 801 to the outlet star wheel 803, which then delivers it to the outside.

A cap feeder 804 includes a sorter 806 and a chute 807. Caps are aligned into one row by the sorter 806, which is received by the chute 807 to be supplied to a cap conveying unit 805. The cap conveying unit 805 receives caps from the chute 807 at a cap receiving position 800D, and then conveys them in the direction indicated by an arrow B to hand them to capping heads on the capper 801 at a cap delivery position 800E which is located above the inlet star wheel 802.

Figure 29:
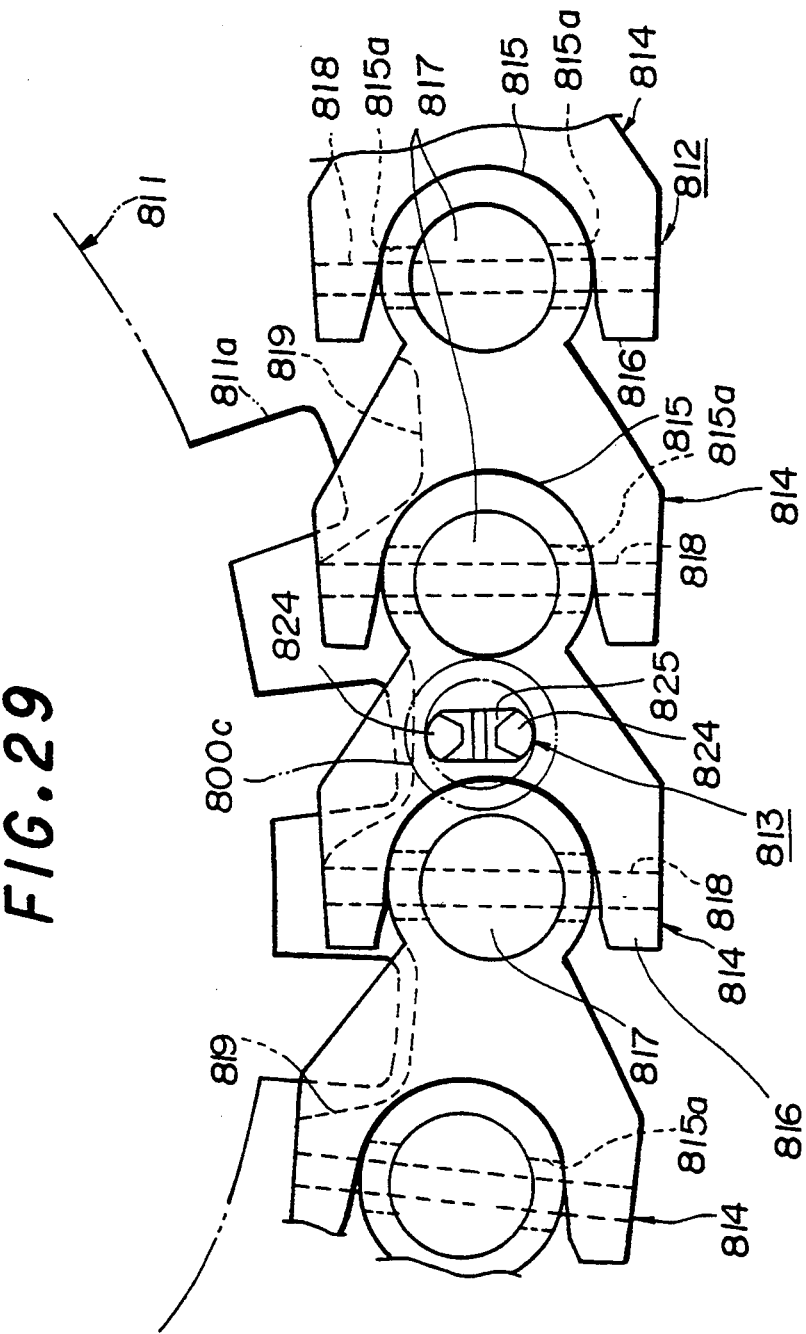
FIG. 29 is an enlarged view of an essential part of FIG. 28.

The cap conveying unit 805 comprises an endless chain 812 extending across a pair of sprockets 811, and a plurality of cap holder means 813 are mounted on the endless chain 812 at a given interval. As shown in FIG. 29, the endless chain 812 comprises a number of links 814 which are connected together, each link 814 including a hollow cylindrical portion 815 disposed forwardly and which is connected to a forked portion 816 located rearwardly, as viewed in the direction of movement of the chain.

The hollow cylindrical portion 815 includes a solid cylindrical member 817 which is rotatably fitted therein and which is rockably fitted in the forked portion 816 of a preceding link 814 in coaxial relationship with the axis of the cylindrical portion 815. The solid cylindrical member 817 and the forked portion 816 are connected together by a transverse connecting pin 818. The connecting pin 818 has its one end connected to one of the limbs of the forked portion 816, and then extends through a radial slit 815a formed in one side of the hollow cylindrical portion 815, extends through another radial slit 815a formed in the other side of the hollow cylindrical portion 815 and its other end connected to the other limb of the forked portion 816.

In this manner, the forked portion 816 of a preceding link 814 and the hollow cylindrical member 817 of a succeeding link 814 are integrally connected together through the connecting pin 818, and these both members are rockable with respect to the axis of the hollow cylindrical portion 815 of the following link 814.

On the side which defines the inside of the endless chain 812 which forms a closed loop, the forked portion 816 of each link 814 is formed with a recess 819 (see FIG. 31) which allows the advancement of a tooth 811a of the sprocket 811 thereinto, thus allowing the advancement of the tooth 811a into the recess 819 to push the rear end of the forked portion 816 of the preceding link 814 to drive the endless chain 812 for circulating movement.

Referring to FIG. 28, it will be noted that the cap holder means 813 is mounted on every third link 814. As shown in FIGS. 30 and 31, each cap holder means 813 is provided with a pair of L-shaped movable members 824, each of which carriers a slide 824 on its bottom. Around its inner peripheral surface, the forked portion 816 of the link 814 is formed with a stepped opening 814a which extends in the axial direction of the hollow cylindrical portion 815. A body or shank portion 824b of each movable member 824 is fitted in the stepped opening 814a, and slits 814b extend transversely and in opposite directions from the stepped opening 814a to receive slides 824a of each movable member 824. In this manner, the both movable members 824 are reciprocable in both directions which are perpendicular to the direction of movement of the endless chain 812.

A triangular cam member 825 is elevatably fitted in the stepped opening 814a, and has a cam surface against which a cam surface 824c (see FIG. 31) formed on the inner surface of each movable member 824 at its bottom bears. The cam member 825 is urged upward by springs 826 disposed between the cam member and the bottom of the stepped opening 814a. Each movable member 824 is urged toward the cam member 825 by a spring 827 which is received in a transverse opening 814c formed in the top of the stepped opening 814a. The resilience of the spring 826 is chosen to be greater than that of the spring 827 so that the cam member 825 is normally maintained at its raised position against the resilience of the spring 827, thereby maintaining the both movable members 824 in their expanded condition. In this expanded condition of the both movable members 824, an outer diameter depicted by the shank portions 824b is greater than the diameter of the inner peripheral surface of the cap 800C.

The cam member 825 is formed of an iron material, so that when the cap holder means 813 moves over a magnet 843 (see FIG. 31), disposed at a given location, the cap holder means 813 is attracted downward by the magnetic force of the magnet 843 against the resilience of the spring 826. When so attracted, the movable members 824 are driven toward each other or toward the central position by the spring 827 to assume a shrunk condition in which an outer diameter depicted by the shank portions 824b of the movable members 824 is less than the diameter of the inner peripheral surface of the cap 800C.

As shown in FIG. 28, the magnet 843 extends from the cap receiving position 800D where caps are received from the chute 807 by the cap holder means 813 to a rearward direction, as viewed in the direction of running of the endless chain 812. Over an extent defined by the location of the magnet 843, the cap holder means 813 is maintained in its shrunk condition, presenting a reduced outer diameter.

With the described arrangement, the cap holder means 813 is conveyed by the running of the endless chain 817, and when the cap holder means 813 is located directly above the magnet 843, the magnet 843 forces the cam member 825 down against the resilience of the spring 826, whereby the cap holder means 813 assumes its shrunk condition. When the cap holder means 813 reaches the cap receiving position 800D under this condition, it takes one of caps 800C from the chute 807. Since the cap holder means 813 then assumes a shrunk condition, the cap holder means 813 easily advance into the inside of the cap 800C in order to hold it.

When the cap holder means 813 moves into the cap 800C, the cap holder means 813 moves past the position directly above the magnet 843, whereby the cam member 825 is allowed to move upward under the resilience of the spring 826, causing the cap holder means 813 to assume an expanded condition. Thereupon, the cap 800C is centered with respect to the cap holder means 813. If the variety of the cap is changed to change the inner diameter of the inner peripheral surface, the centering action takes place similarly, and accordingly, it is assured that the cap 800C be centered with respect to the cap holder means 813 regardless of varying inner diameter of the caps 800C.

The cap holder means 813 then moves to the cap delivery position 800E with the cap 800C centered thereon. At the delivery position 800E, a capping head, not shown, of the capper 801 is caused to descend, and there occurs a relative movement of the cap 800C into the capping head to be held thereby. The insertion of the cap into the capping head takes place smoothly inasmuch as the cap 800C is centered with respect to the cap holder means 813. Subsequently, the capping head is raised, and the cap 800C is then removed from the cap holder means 813 and is then fitted around the mouth of a vessel. The cap holder means 813 which is emptied as a result of the cap 800C being delivered to the capping head moves to a position located directly above the magnet 843 again where it assumes a shrunk condition to repeat the described operation.

Figure 32:
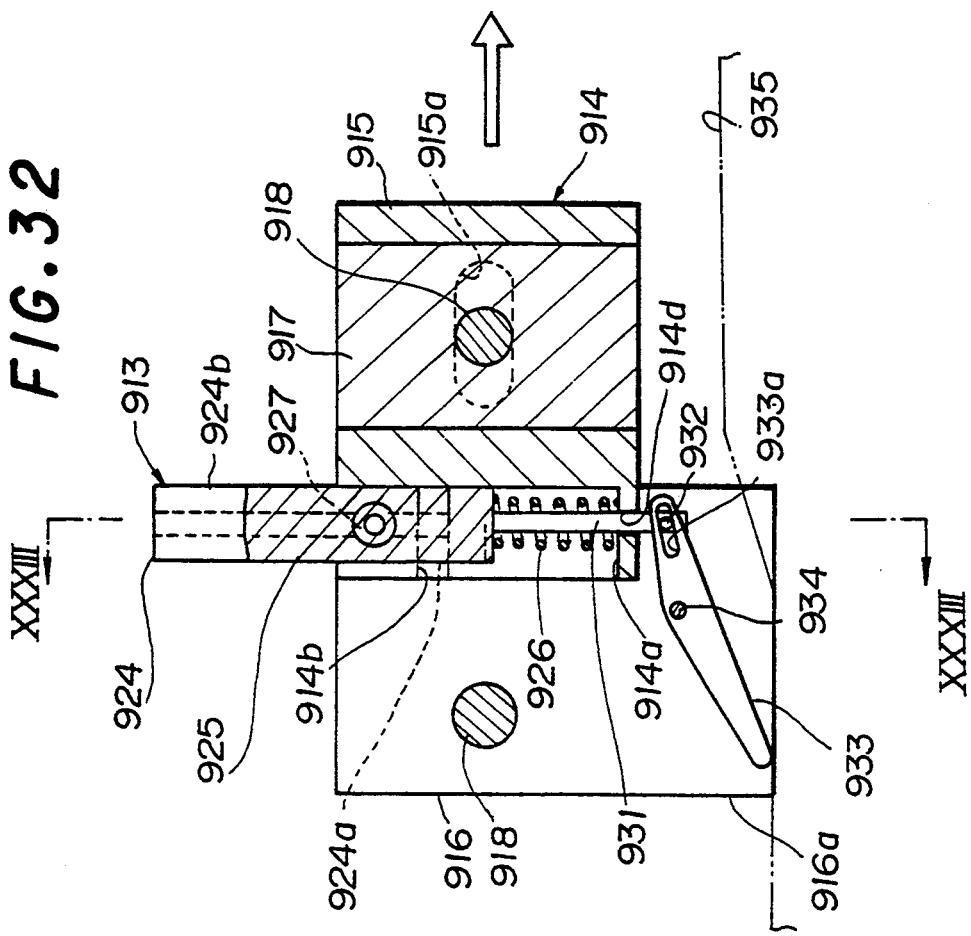
FIG. 32 is a cross section of a tenth embodiment of the invention.
Figure 33:
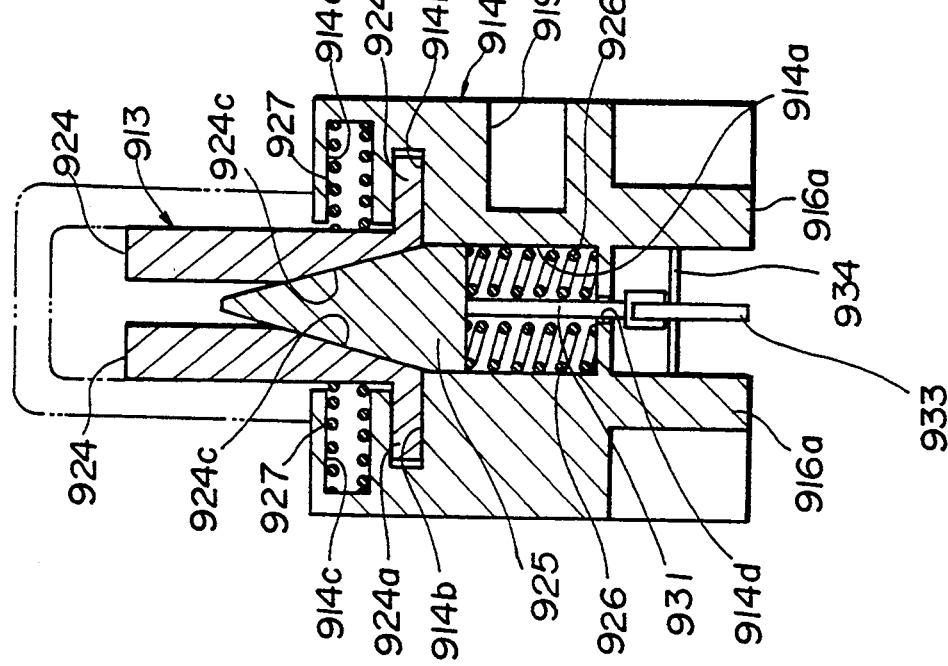
FIG. 33 is a cross section taken along the line XXXIII—XXXIII shown in FIG. 32.

FIGS. 32 and 33 show another embodiment of cap holder means 913 including movable members 924 which are operated for expansion or shrinkage by a cam mechanism rather than by a magnet. The cap holder means 913 of this embodiment is similarly constructed as the ninth embodiment shown in FIGS. 28 to 31, and accordingly corresponding parts as those shown in these Figures are illustrated by like numerals in FIGS. 32 and 33 as those used in FIGS. 28 to 31, to which 100 is added to denote reference numerals on the 900 series.

In this embodiment, a forked portion 916 of each link 914 is formed with a lower extensions 916a depending downward from respective limbs so as to secure a space below a cylindrical portion 915 even when a cylindrical portion 915 of a succeeding link 914 is inserted into the forked portion 916.

The movable members 924 are operated for expansion or shrinkage by a cam member 925, and a rod 931 is fixedly mounted on the bottom of the cam member 925 to extend downward. The rod 931 slidably extends through a through-opening 914d formed in the bottom of a stepped opening 914a, and fixedly carries a pin 932 on its lower end, which engages an elongate slot 933a formed in one end of a triangular cam lever 933. The cam lever 933 is rockably connected to the link 914 by being pivotally mounted on a pin 934, disposed rearward, as viewed in the direction of conveyance of the link 914, of the rod 931. The other end of the cam lever 933 extends obliquely downward in the rearward direction, as viewed in the direction of conveyance of the link.

In the present embodiment, the magnet 843 mentioned in the immediately preceding embodiment is replaced by a cam member 935 which is fixedly mounted at the location where the magnet 843 was disposed, for engagement with the cam lever 933. As the link 914 moves forward, the cam member 935 moves relative thereto, thus extending into the pair of laterally spaced extensions 916a to engage the lower end of the cam lever 933 to rotate it counter-clockwise, as viewed in FIG. 32, about the pin 934. This acts through the rod 931 to cause a descending movement of the cam member 925, whereby the movable member 924 are driven toward each other by the spring 927 to assume a shrunk condition, presenting an outer diameter depicted by the shank portions 924b which is less than the diameter of the inner peripheral surface of the cap.

Figure 34:
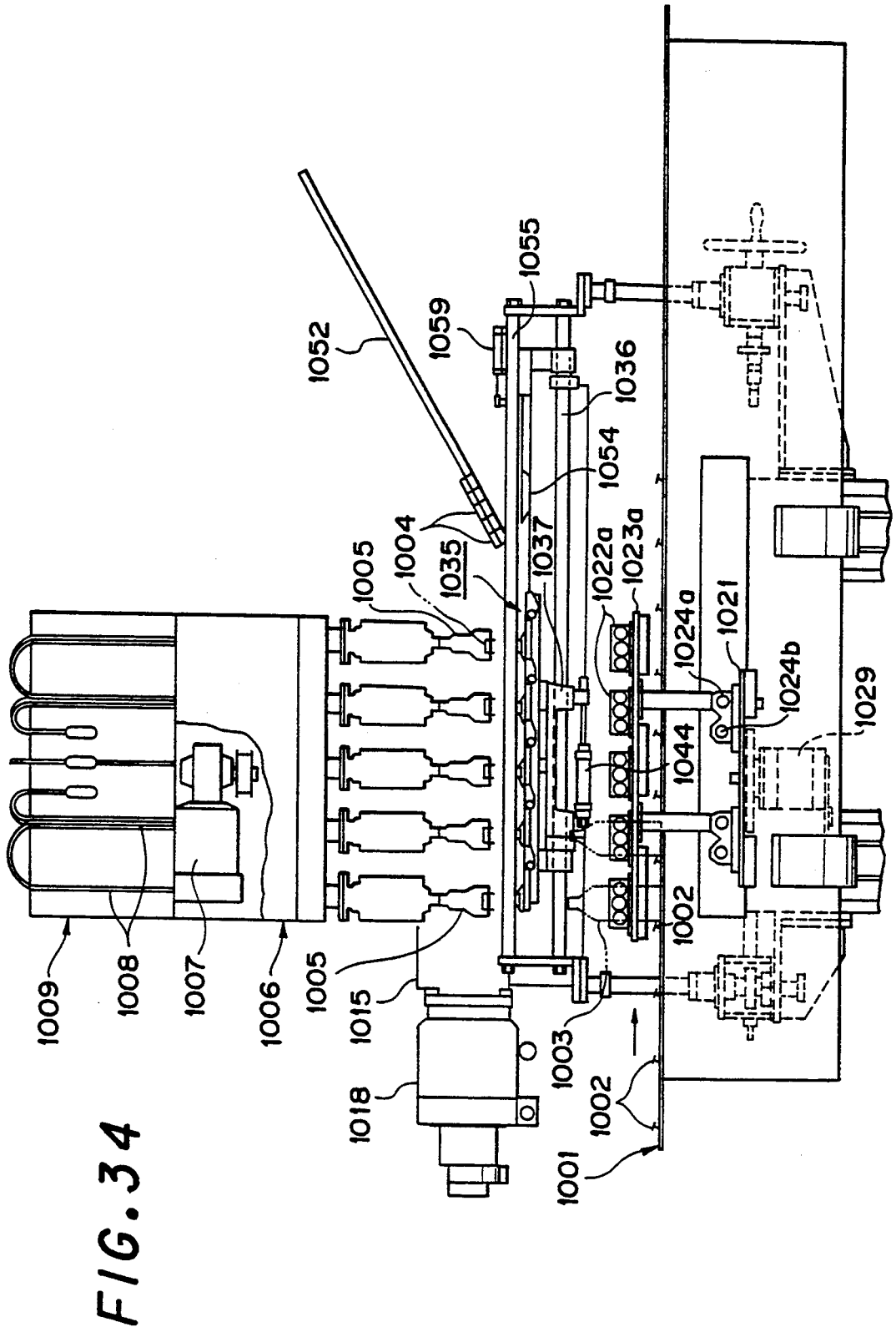
FIG. 34 is a front view of an eleventh embodiment of the invention.
Figure 35:
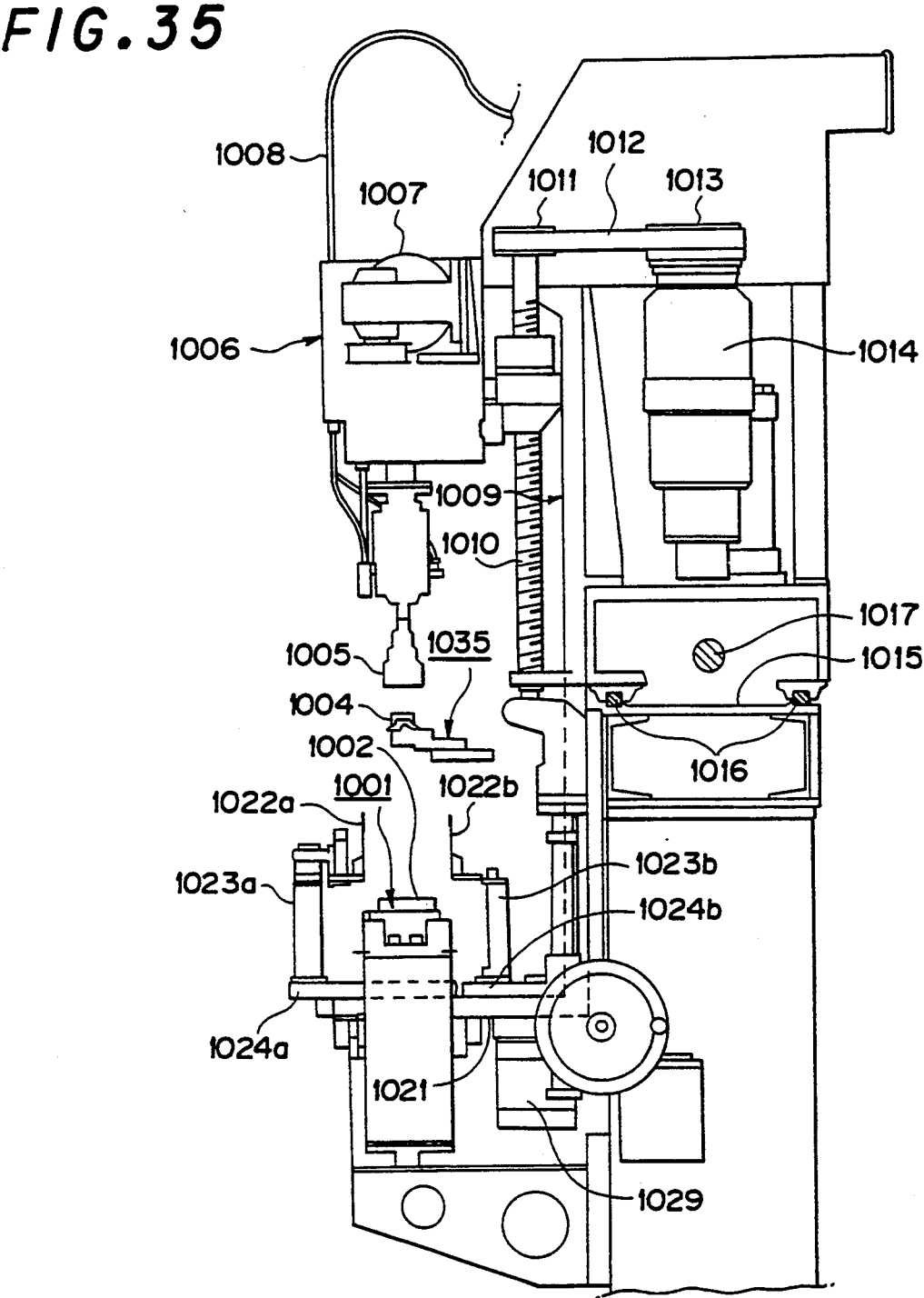
FIG. 35 is a right-hand side elevation of FIG. 34, partly in section.

FIGS. 34 to 41 show an eleventh embodiment of the invention. Referring to FIGS. 34 and 35, a conveyor 1001 is provided with vessel positioning push bars 1002 at a given interval, and vessels 1003 are conveyed in one row by the conveyor with a given spacing therebetween which is determined by the abutment of the respective vessels 1003 against the associated push bars 1002.

Capping heads 1005 which function to apply screw caps 1004 simultaneously to five consecutive vessels 1003 are disposed above the conveyor 1001. The capping heads 1005 are mounted on an elevating frame 1006 at the same spacing as the spacing with which the vessels 1003 are spaced apart on the conveyor 1001, and are adapted to be simultaneously driven for rotation in the same direction by a common motor 1007 mounted on the frame 1006.

Each capping head 1005 is supplied with compressed air through a flexible hose 1008, and functions to hold a cap 1004 when the compressed air is supplied thereto, but to release the cap 1004 when the supply is interrupted.

The elevating frame 1006 is elevatable along a guide rod, not shown, which is vertically mounted on a movable framework 1009, and is threadably engaged with a threaded shaft 1010 which is rotatably journalled on the framework 1009 in parallel relationship with the guide rod. The threaded shaft 1010 is adapted to be driven through a pulley 1011 mounted on its top end, a timing belt 1012 extending around the pulley 1011 and another pulley 1013 which is mounted on the output shaft of a servo motor 1014, fixedly carried by the framework 1009. By driving the servo motor 1014 for rotation in forward or reverse direction, the elevating frame 1006 and the capping heads 1005 can be moved up and down depending on the direction of rotation.

The movable framework 1009 is reciprocable along a pair of guide rails 1016 mounted on a machine frame 1015, running parallel to the conveyor 1001. A threaded shaft 1017 journalled on the machine frame 1015 and extending parallel to the guide rails 1016 is threadably engaged with the movable framework 1009. The threaded shaft 1017 is driven by a servo motor 1018 mounted on the machine frame 1015, shown in FIG. 34, so that as the threaded shaft 1017 is driven for rotation either in the forward or reverse direction by the servo motor 1018, the movable framework 1009 can be moved back and forth in synchronism with the vessels 1003 which are conveyed by the conveyor 1001.

A support plate 1021 is integrally connected to the bottom of the movable framework 1009, and extends below the conveyor 1001 in a direction to cross the latter. As the movable framework 1009 reciprocates, the support plate 1021 can be moved back and forth along the conveyor 1001.

Figure 36:
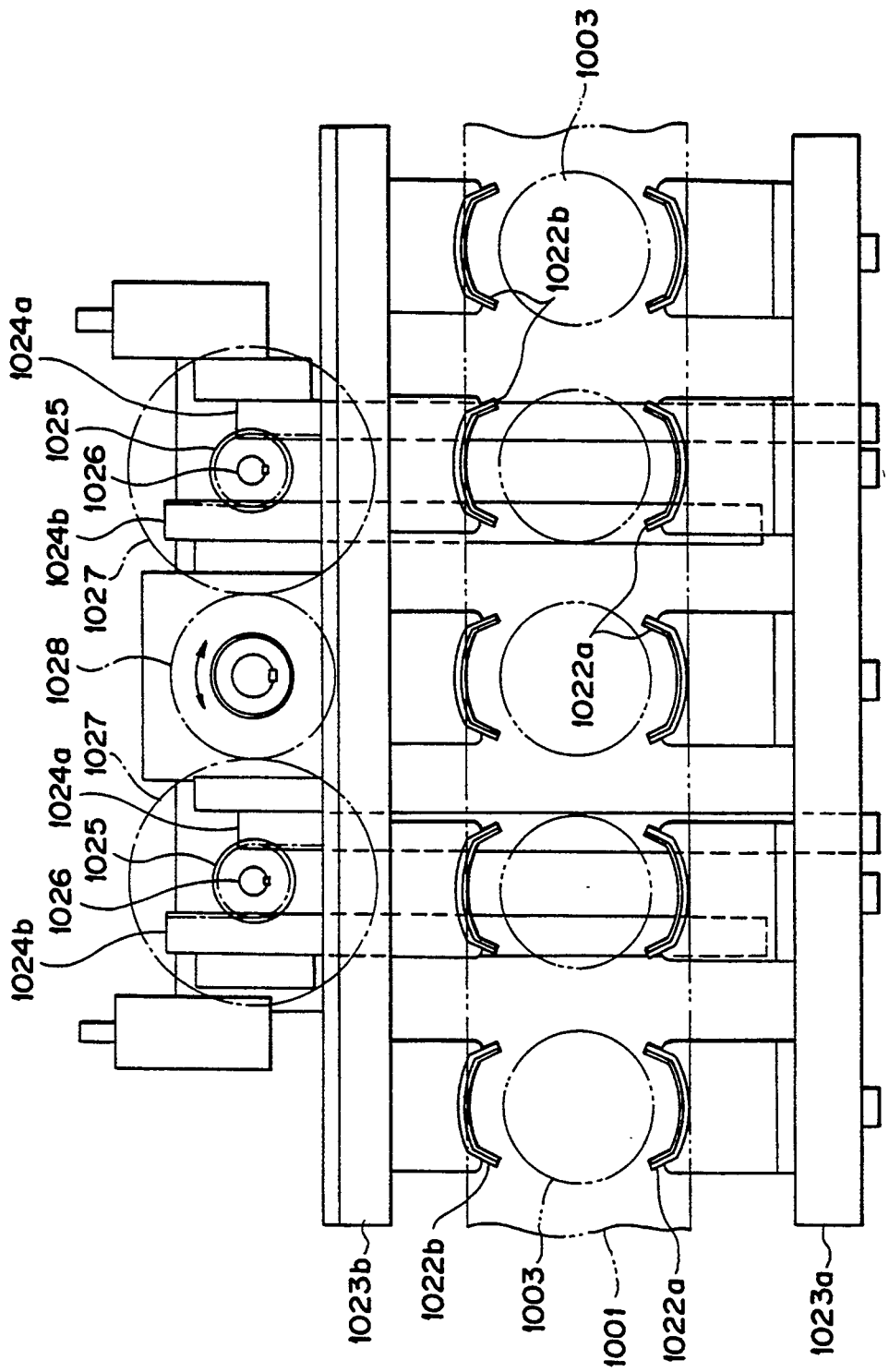
FIG. 36 is an enlarged plan view of vessel grippers 1022a, 1022b.
Figure 37:
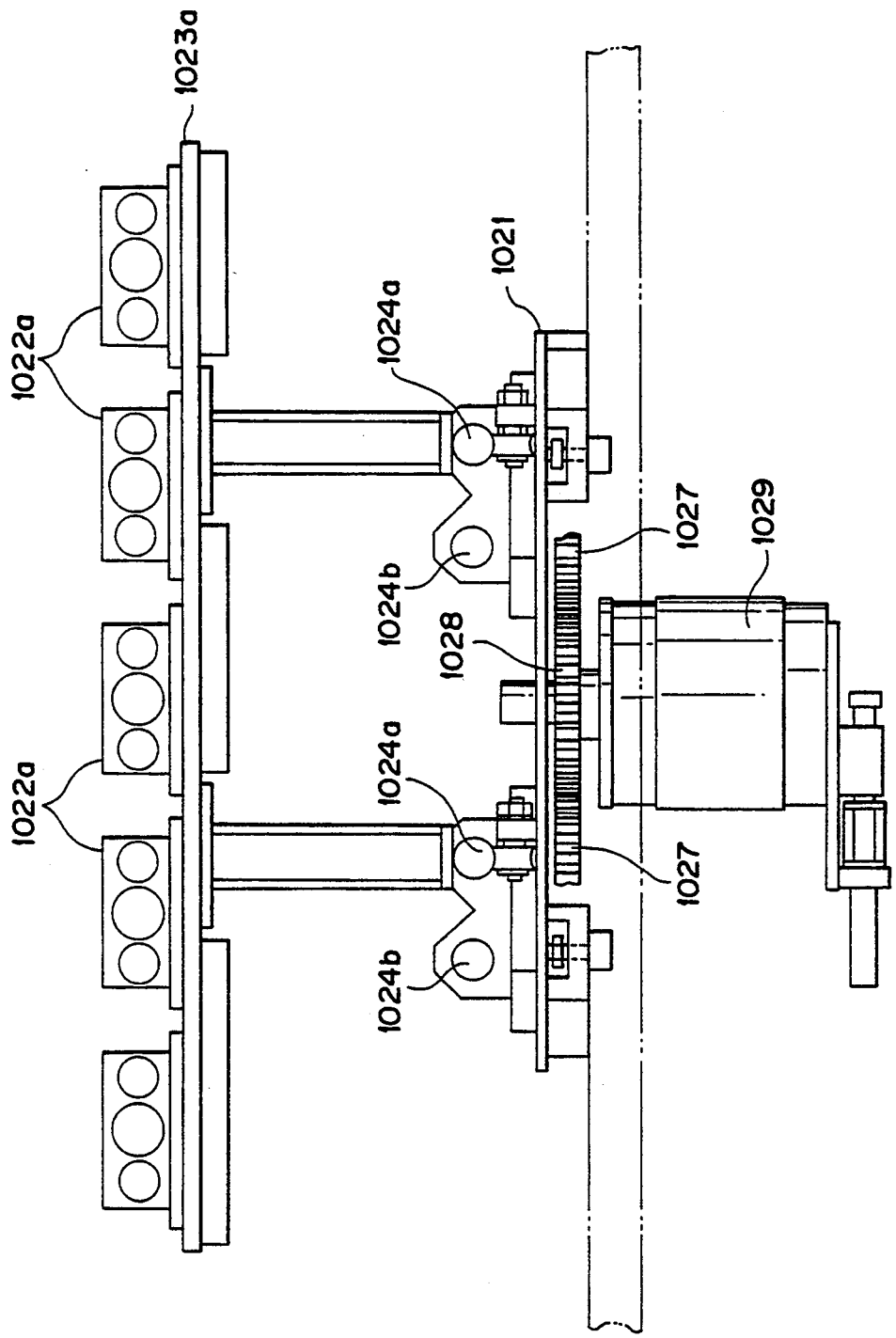
FIG. 37 is a front view of FIG. 36.
Figure 38:
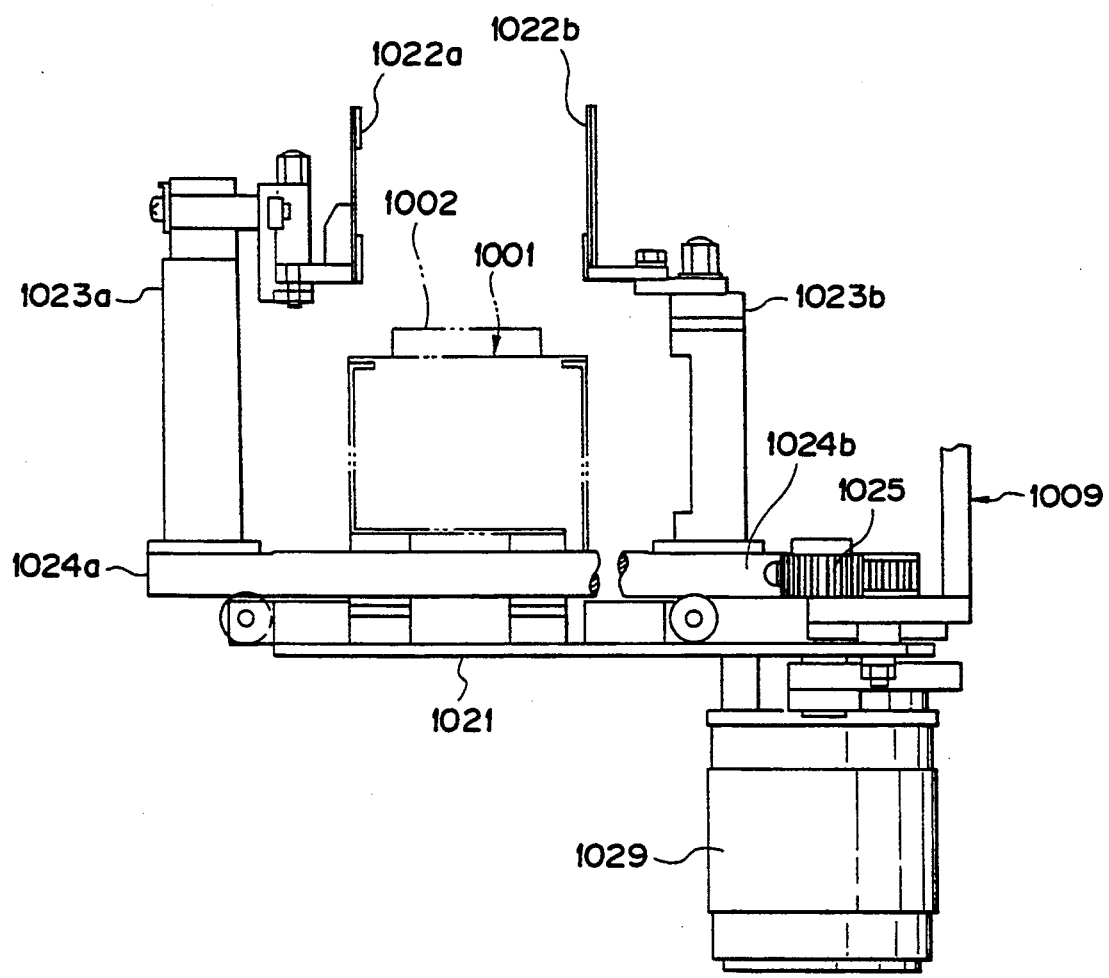
FIG. 38 is a right-hand side elevation of FIG. 36.

Referring to FIGS. 36 to 38, the support plate 1021 has a pair of vessel grippers 1022a, 1022b mounted at a position directly below each capping head 1005 so as to hold the lateral sides of a particular vessel 1003, which is being conveyed by the conveyor 1001. Specifically, the vessel gripper 1022a located to one side of the conveyor 1001 is mounted on a movable member 1023 while the vessel gripper 1022b located to the other side of the conveyor 1001 is mounted on a movable member 1023b. A pair of parallel rack rods 1024a are slidably mounted on the support plate 1021 to extend in a direction perpendicular to the conveyor 1001, while another pair of parallel rack rods 1024b are slidably disposed on the support plate 1021 to one side and adjacent to the rack rods 1024a. The movable member 1023a is mounted on the pair of rack rods 1024a while the movable member 1023b is mounted on the other pair of rack rods 1024b.

A gear 1025 is disposed between and in meshing engagement with the rack rod 1024a on which the movable member 1023a is mounted and the rack rod 1024b on which the movable member 1023b is mounted. Each gear 1025 is mounted on a rotary shaft 1026 on which a gear 1027 of a greater diameter is mounted. A gear 1028 is in meshing engagement with the both gears 1027, and is driven by a servo motor 1029 which is mounted on the support plate 1021.

Accordingly, by rotating the gears 1025 in either forward or reverse direction by means of the servo motor 1029, the rack rods 1024a, 1024b can be driven in mutually opposite directions, and accordingly a corresponding movement of the movable members 1023a, 1023b carried thereon in opposite directions allows each pair of vessel grippers 1022a, 1022b to hold the vessel 1003 therebetween.

Figure 39:
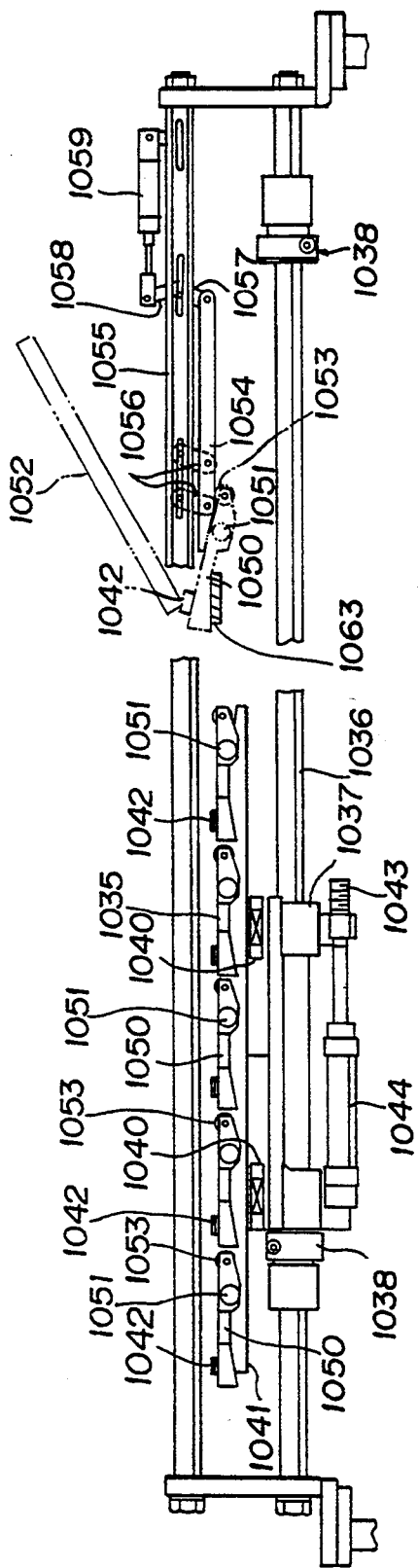
FIG. 39 is a front view of a cap conveying unit 1035.
Figure 40:
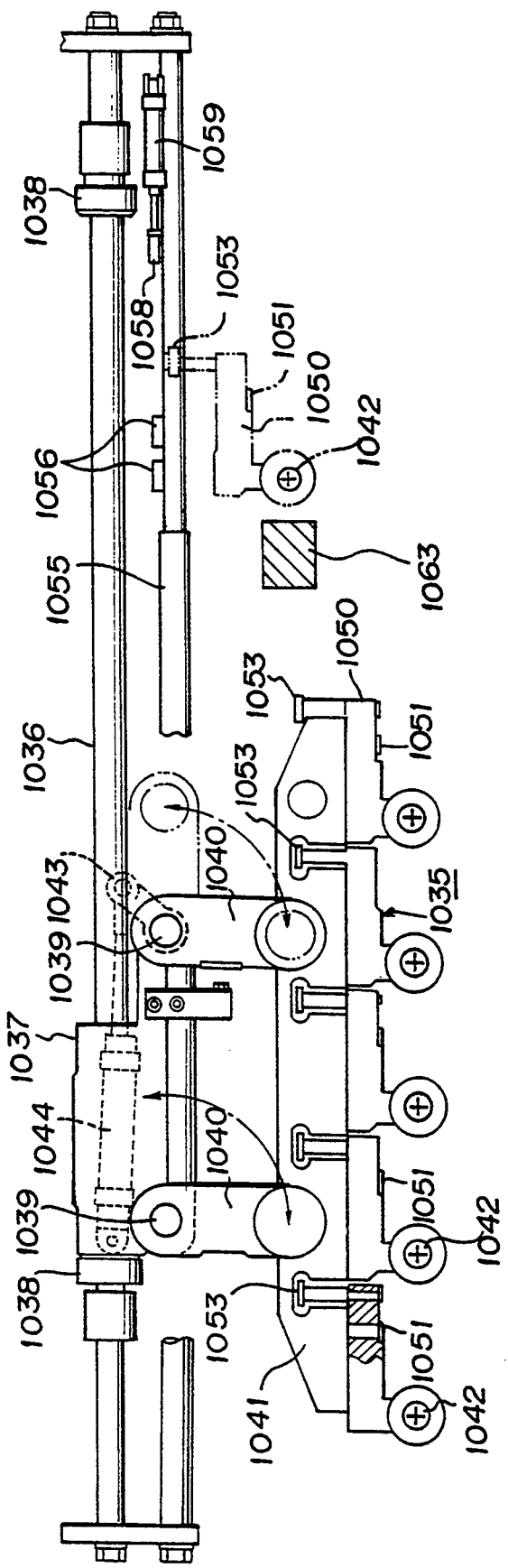
FIG. 40 is a plan view of FIG. 39.

Referring to FIGS. 39 and 40, a cap conveying unit 1035 which supplies caps 1004 to each capping head 1005 comprises a guide rod 1036 mounted on the machine frame 1015, and a reciprocation actuating member 1037 which is reciprocable along the guide rod 1036.

As shown in FIG. 34, the guide rod 1036 is disposed parallel to the conveyor 1001 at an elevation slightly lower than that of the capping head 1005 when it is located at its elevated end position, and is adjustable in its elevation in accordance with the height of the vessel 1003. The reciprocation actuating member 1037 is disposed for reciprocating movement between a pair of stops 1038 located at the opposite ends of the guide rod 1036 when it is driven by a cylinder unit, not shown, or the like.

A pair of rotary shafts 1039 are vertically journalled in the reciprocation actuating member 1037 and are spaced apart in a direction parallel to the conveyor 1004. At its top end, the rotary shaft 1039 carries one end of a rockable arm 1040, the other end of which rotatably carries a movable plate 1041 which is disposed to extend parallel to the conveyor 1001. Five cap holder means 1042 are mounted on the movable plate 1041 at the same spacing as the spacing between the capping heads 1005.

A cylinder unit 1044 is disposed between a lever 1043 which is mounted on the lower end of one of the rotary shafts 1039 and the reciprocation actuating member 1037, and operates to move the movable plate 1041 between a projected position in which it projects toward the conveyor 1001 and a retracted position where it is retracted from the conveyor while maintaining it parallel to the conveyor 1001.

The five cap holder means 1042 mounted on the movable plate 1041 are disposed on the free end of respective arms 1050, which are mounted on horizontal pins 1051 disposed in the movable plate 1041 so as to be rockable in the vertical direction. Each arm 1050 is designed such that a portion of the arm which is located to one side of the pin 1051 and carrying the cap holder means 1042 presents a heavier weight than the other side, so that the arm 1050 normally rotates counterclockwise, as viewed in FIG. 40, about the pin 1051 so that the weight of the portion carrying the cap holder means 1042 is carried by the movable plate 1041 and the arm 1050 is maintained in its horizontal position.

When the movable plate 1041 assumes its retracted position where it is retracted from the conveyor 1001, the cap holder means 1042 is driven for reciprocating movement as the reciprocation actuating member 1037 reciprocates. A chute 1052 which feeds caps 1004 to the cap holder means 1042 is disposed above the center of a locus of travel of the cap holder means 1042.

Together with a sorter, not shown, the chute 1052 constitutes a cap feeder which feeds caps to the individual cap holder means 1042. The chute 1052 guides the caps 1004 as fed from the sorter lengthwise and is capable of locating a leading one of the caps 1004 at the foremost position on the chute. The elevation of the chute 1052 is chosen so as to avoid an abutment of the cap holder means 1042 mounted on the arm 1050 against the cap 1004 when the arm 1050 assumes a horizontal position, thereby allowing a retracting movement of the cap holder means 1042 from its leftmost to its rightmost end.

By contrast, when the cap holder means 1042 is driven forward from its rightmost to its leftmost end, the arm 1050 is inclined to raise the cap holder means 1042, causing the respective cap holder means 1042 to be engaged with the caps 1004 to allow the caps 1004 to be successively taken out of the chute 1052. In order to allow the arm 1050 to be inclined, a cam follower 1053 is mounted on the free end of each arm 1050, and a movable cam 1054 engageable with the cam follower 1053 is disposed adjacent to the chute 1052.

A pair of rocking arms 1056 mount the movable cam 1054 on a fixed rod 1055 which is disposed parallel to the guide rod 1036 to allow a vertical movement of the cam 1054, which is then connected through a connection member 1057 connected thereto and an actuating arm 1058 which is rockably mounted on the fixed rod 1055 to a cylinder unit 1059, thereby allowing the operation of the cylinder unit 1059 to cause a vertical movement of the movable cam 1054.

At its lowermost position, the movable cam 1054 has its lower surface disposed for abutment by the cam follower 1053, thereby causing the arm 1050 to be inclined to raise the cap holder means 1042.

Figure 41:
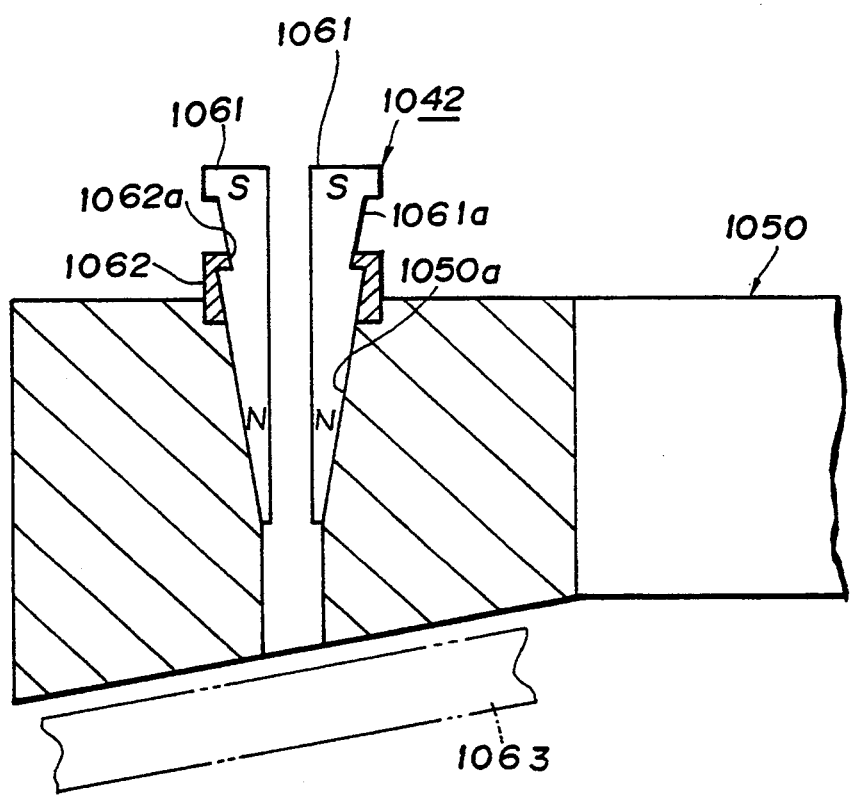
FIG. 41 is a cross section of cap holder means 1042.

Referring to FIG. 41, each of the cap holder means 1042 includes four movable members 1061, which are four equal segments which are circumferentially divided from an inverted conical magnet. Each movable member 1061 is elevatably fitted in an inverted conical cam opening 1050a formed in the arm 1050. Magnets formed by the respective movable members 1061 are of like polarity, whereby the force of repulsion acting therebetween causes these members to be spaced apart and raised along the inclined surface defining the cam opening 1050a to be located at their elevated end positions.

A ring-shaped stop member 1062 is fitted in the opening of the cam opening 1050a, and is formed with a stop 1062a at its top end which projects radially inward for engagement with a groove 1061a formed at a given location in the outer peripheral surface of the movable member 1061 to allow an elevating movement of the movable member 1061 within an extent as defined by the groove 1061a.

When the movable member 1061 is located at its elevated end position, the cap holder means 1042 assumes an expanded condition, presenting an outer diameter depicted by the periphery of the individual movable members 1061 which is greater than the diameter of the inner peripheral surface of the cap 1004. By contrast, when the movable members 1061 are attracted by a magnet 1063 of dissimilar polarity and move down along the inclined surface while overcoming the force of repulsion acting therebetween, they move toward each other along the cam opening 1050a, whereby the cap holder means 1042 assume a shrunk condition, presenting an outer diameter depicted by the individual movable members 1061 which is less than the diameter of the inner peripheral surface of the cap 1004.

Referring to FIGS. 39 and 40, a magnet 1063 is mounted below the free end of the chute 1052, and when the arms 1050 are inclined to raise the individual cap holder means 1042 to thereby cause the cap holder means 1042 to engage the caps 1004 on the chute 1052, the magnet 1063 enables the individual cap holder means 1042 to be maintained in their shrunk condition.

The operation of the described arrangement will now be described. When the movable framework 1009 is located at its retracted end or the leftmost end as viewed in FIG. 34 and when the elevating frame 1006 and the capping heads 1005 are located at their elevated end positions, the capping head 1005 ceases to rotate. Each of the cap holder means 1042 assumes an expanded condition to retain the cap 1004. The cylinder unit 1044 causes the movable plate 1041 to project toward the conveyor 1001 to locate the cap holder means 1042 directly below the capping head 1005 which then assumes its raised end position, and the pair of vessel grippers 1022a, 1022b remain open.

When the elevating frame 1006 slightly descends from this condition, the cap 1004 is inserted into each of the capping heads 1005 as a result of a relative movement, but since the inner peripheral surface of the cap 1004 is retained by the cap holder means 1042 which assumes its expanded condition, the cap is centered with respect to the cap holder means 1042 and therefore a smooth insertion of the cap 1004 into the capping head 1005 is assured.

As the cap 1004 is inserted into the capping head 1005, compressed air is supplied to each capping head 1005 through the flexible hose 1008, whereupon each capping head 1005 holds the associated cap 1004. Then the elevating frame 1006 is raised slightly to forcibly take the cap 1004 out of the cap holder means 1042 which then assumes the expanded condition, and when such action occurs, the cylinder unit 1044 retracts the movable plate 1041, whereby the individual cap holder means 1042 are retracted from their positions assumed previously which are located directly below the associated capping heads 1005. Each capping head 1005 then begins to rotate.

Subsequently, when five consecutive vessels 1003 are conveyed between pairs of vessel grippers 1022a, 1022b, the movable framework 1009 is advanced in synchronism and at the same speed as the vessels 1003, whereby the elevating frame 1006 and the pairs of vessel grippers 1022a, 1022b are driven forward at the same speed as the vessels 1003. The pairs of vessel grippers 1022a, 1022b are then driven toward each other, thus holding respective associated vessels 1003.

When the elevating frame 1006 and the capping heads 1005 descend, the cap 1004 carried by each capping head 1005 is clamped around the associated vessel 1003 as the capping head 1005 rotates. When a clamping of the cap 1004 is completed, the capping head 1005 ceases to rotate and the supply of the compressed air is interrupted, whereby the capping head 1005 releases the cap 1004. The capping heads 1005 are then raised together with the elevating frame, and when the pair of vessel grippers 1022a, 1022b release the vessels 1003, the movable framework 1009 is retracted to its original position at a high speed.

On the other hand, after the cap holder means 1042 has handled the cap 1004 to the capping head 1005 and is retracted from its position located directly below the hand, the cap holder means 1042 is moved to the retracted end or to the right, as viewed in FIG. 34, by a cylinder unit, not shown. Since the movable cam 1054 assumes its raised end position at this time, the movement of the cap holder means 1042 to the retracted end can take place without abutting against the cap 1004 on the chute 1052.

When the cap holder means 1042 has been moved to its retracted end position, the cylinder unit 1059 lowers the movable cam 1054 to its lowermost position, whereupon the cap holder means 1042 is driven forward, and the cam follower 1053 associated with the cap holder means 1042 engages the movable cam 1054 to rock the arm 1050, thus raising the cap holder means 1042. In this manner, the cap holder means 1042 engages the cap 1004 located on the free end of the chute 1052, thus successively taking caps 1004 from the chute 1052.

During this process, the magnet 1063 causes the individual movable members 1061 of the cap holder means 1042 to be lowered against the force of repulsion acting therebetween, whereby the cap holder means 1042 assume a shrunk condition presenting an outer diameter depicted by the periphery of the movable members 1061 which is less than the diameter of the inner peripheral surface of the cap 1004. Accordingly, the upper end of the cap holder means 1042 is allowed to advance into the cap 1004 smoothly, thus taking the cap 1004 from the chute 1052.

After the cap holder means 1042 has taken the cap 1004 from the chute 1052, and as it moves past the magnet 1063, the force of repulsion acting between the individual movable members 1061 causes them to move apart to assume an expanded condition, whereby the inner peripheral surface of the cap 1004 is retained by the cap holder means 1042 and thus is centered with respect thereto.

Subsequently, when the cap holder means 1042 is driven forward to its foremost position, the cylinder unit 1044 causes the movable plate 1041 to project toward the conveyor 1001, and is then retracted to its retracted position after the capping head 1005 is maintained at its elevated end position, the capping head 1005 will be located directly above the cap holder means 1042. Subsequently, the described operation is repeated for each of the five vessels in a sequential manner.

In the eleventh embodiment, a displacement mechanism which causes a relative displacement between the cap holder means 1042 and the chute 1052 acted to move the cap holder means 1042 toward the chute 1052. However, the free end of the chute 1052 may be displaced relative to the cap holder means 1042 to thereby prevent an abutment of the cap holder means against a cap located on the free end of the chute. In addition, the reciprocation actuating member 1037, the movable plate 1041 and the arms 1050 may be arranged to be integrally reciprocable in a direction crossing the conveyor 1001 or in a direction parallel to the plane of the drawing, as viewed in FIG. 40, and also in the vertical direction, and the cap holder means 1042 may be associated with the separate chute 1052, so that the cap holder means 1042 may be directly mounted on the reciprocation actuating member 1037.

While the invention has been disclosed above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A cap conveying unit comprising cap holder means for holding the inner peripheral surface of a cap, and conveying means for conveying the cap holder means along a circulating path, the cap holder means receiving a cap to be fed from a cap feeder and delivering it to a capping head where the cap delivered is applied to a vessel; characterized in that the cap holder means has an outer diameter which is variable between a shrunk condition in which the outer diameter is less than the diameter of the inner peripheral surface of the cap and an expanded condition in which the outer diameter is greater than the diameter of the inner peripheral surface of the cap.

2. A cap conveying unit according to claim 1 in which the cap holder means is switched between the shrunk and the expanded condition by a cam mechanism in accordance with a position to which the cap holder means has moved.

3. A cap conveying unit according to claim 1 in which the cap holder means is normally maintained in one of the shrunk and the expanded condition when free from a magnetic influence of a magnet, but is changed to the other condition under the magnetic influence of the magnet.

4. A cap conveying unit according to claim 1 in which the cap holder means comprises a plurality of movable members which are reciprocable in a radial direction, a cam member disposed to be elevatable and located at the center defined by the respective movable members for reciprocably driving the movable members in the radial direction as it is elevated, and a first spring for urging the movable members in a direction to reduce an outer diameter depicted by the movable members, causing the movable members to abut against a cam surface defined around the periphery of the cam member.

5. A cap conveying unit according to claim 4 in which each movable member carries a slide at its lower end which extends radially outward, the upper surface of each slide being slidably covered by a lid.

6. A cap conveying unit according to claim 5 in which a ring-shaped guide plate is fixedly disposed around the movable members, and is formed with a plurality of triangular guides which are located at spaced points around the inner peripheral surface thereof and extending inwardly, the slide of each movable member being disposed for abutment against an associated one of the guides so that the movement of the movable members in the radial direction is guided by the guides.

7. A cap conveying unit according to claim 4, further including an elevating plate elevatably disposed below the cam member, a cam mechanism for elevating the elevating plate, and a second spring disposed between the elevating plate and the cam member for urging the cam member upward, the first spring exhibiting a resilience which causes the cam member to descend to cause in turn the movable members to be shrunk when the elevating plate descends to cause an elongation of the second spring, the second spring exhibiting a resilience which is enough to cause the cam member to be raised to expand the movable members against the resilience of the first spring when the elevating plate is raised to compress the second spring.

8. A cap conveying unit according to claim 7 in which the cam mechanism causes the elevating plate to descend to cause the movable members to be shrunk when receiving a cap from the cap feeder, and raises the elevating plate to cause the movable members to be expanded when delivering the received cap to the capping head.

9. A cap conveying unit according to claim 1 in which the cap holder means comprises a plurality of movable members which are reciprocable in a radial direction, a cam surface formed around the outer peripheral surface of the movable member at its bottom and disposed in an inverted conical opening, a resilient member disposed at the center defined by the movable members for urging the movable members radially outward to cause the cam surface to abut against the inner surface of the inverted conical opening, and a spring for normally urging the movable members at their elevated end positions to maintain the movable members in their expanded condition.

10. A cap conveying unit according to claim 9 in which the movable members are depressed by a cap fed from the cap feeder against the resilience of the spring to assume a shrunk condition.

11. A cap conveying unit according to claim 4 in which the cam member is operated for elevating movement by a magnet.

12. A cap conveying unit according to claim 11 in which the magnet is disposed at a cap receiving position where a cap from the cap feeder is received, the magnet attracting the cam member to cause the movable members to assume a shrunk condition when the latter receive a cap.

13. A cap conveying unit according to claim 1 in which the cap holder means comprises a plurality of movable members formed by magnets of like polarity which act to repel each other, and a cam surface formed around the outer periphery of each movable member at its bottom and disposed within an inverted conical opening, the movable members being urged by a force of repulsion acting between the magnets of like polarity to be moved away from each other, whereby the cam surface is resiliently urged into abutment against the inner surface of the inverted conical opening to maintain the movable members at their raised end position to assume an expanded condition.

14. A cap conveying unit according to claim 13 in which the movable members are attracted by a magnet of dissimilar polarity to move down, whereby they assume a shrunk condition.

15. A cap conveying unit according to claim 1 in which the cap holder means comprises a stanchion, a bag-shaped movable member formed by an elastic member and wrapped around the stanchion, and a magnetic fluid sealingly confined within the movable member, the movable member being clamped intermediate its length to prevent it from bulging radially outward while leaving the upper and lower ends to be free to bulge radially outward, the lower end of the movable member being clamped by a band formed of a resilient member so that the upper end of the movable member normally bulges radially outward to assume an expanded condition.

16. A cap conveying unit according to claim 15, further including a magnet for attracting the magnetic fluid sealingly confined within the movable member to cause the magnetic fluid to shift downward within the movable member against the clamping force of the band, thereby establishing a shrunk condition for the outer diameter of the upper end of the movable member.

17. A cap conveying unit according to claim 1 in which the cap holder means comprises a vertically disposed cylinder, a spherical movable member formed by a resilient member which covers and seals the upper end opening of the cylinder, an elevatable piston fitted into the cylinder from below, and a liquid which is sealingly confined within the cylinder and the movable member, an elevating movement of the piston causing the movable member to expand and shrink.

18. A cap conveying unit according to claim 17 in which the piston is normally maintained at its elevated end position to maintain the movable member in its expanded condition, and is attracted downward by a magnet to cause the movable member to assume a shrunk condition.

19. A cap conveying unit according to claim 1 in which the capping head comprises a gripper member for gripping the outer periphery of a cap, and an insertion opening defined centrally in the gripper member for insertion therein of a cap, a cap inserted into the insertion opening being gripped by the gripper member as the capping head undergoes a downward movement,
   each cap holder means including a movable member which may be shrunk to achieve a shrunk condition of the cap holder means presenting an outer diameter which is less than the diameter of the inner peripheral surface of the cap and which may be expanded to achieve an expanded condition of the cap holder means presenting an outer diameter greater than the diameter of the inner peripheral surface of the cap, the movable member being normally urged to be expanded,
   the capping head including an urging member for moving the movable member from its expanded to its shrunk position in interlocked relationship with the movable member as the capping head descends when the cap held by the cap holder means is inserted into the insertion opening, but before the cap is gripped by the gripper member.

20. A cap conveying unit according to claim 1, further including a plurality of cap holder means disposed around the outer periphery of a rotatable body at an equal interval.

21. A cap conveying unit according to claim 1 in which the cap holder means is disposed on the free end of each of a plurality of rocking arms which are mounted around the outer periphery of a rotatable body at an equal interval, a rocking motion of the rocking arms and a rotation of the rotatable body being arranged such that the cap holder means on the respective rocking arms pass through a position located directly below each of capping heads mounted on the rotatably body, and through a cap feeder located externally of the rotatably body.

22. A cap conveying unit according to claim 1 in which the cap holder means is disposed in a separate holder, and each holder is conveyed by the conveying means along a circulating path.

23. A cap conveying unit according to claim 22 in which the conveying means comprises a first branch path for conveying the holder which has received a cap from one of a pair of cap feeders, a second branch path for conveying the holder which has received a cap from the other cap feeder, a first collector for merging the holders which are supplied from the respective branch paths into one row, and a branch unit for branching the emptied holders, disposed in one row after they have delivered the caps to the capping heads, into the first and the second branch path.

24. A cap conveying unit according to claim 23, further including a cap checker located between the first collector and a cap delivery position where a cap is delivered from the cap holder means in the holder to the capping head for detecting the presence or absence of a cap, a rejector located between the cap checker and the cap delivery position for rejecting an empty holder which has no cap to a reject path, and a second collector located between the cap delivery position and the branch unit for merging the holders from the reject path and the holders which has moved past the cap delivery position into one row.

25. A cap conveying unit according to claim 24, further including a reverser located between the cap delivery position and the second collector for reversing the holder to remove any remaining cap from the cap holder means in the holder.

26. A cap conveying unit according to claim 22 in which the holder is cylindrical in configuration.

27. A cap conveying unit according to claim 22 in which the holder is in the form of a prism, and the conveying means conveys the holder while they are oriented in a give direction.

28. A cap conveying unit according to claim 27, in which the cap holder means comprises a plurality of radially reciprocable movable members which are generally disposed to define a cylindrical configuration, an elevatable first cam member disposed at the center of the cylindrical configuration for operating the movable members to reciprocate in the radial direction as the cam member is elevated, a slit formed in the bottom of the holder and extending in the direction of conveyance, and a cam lever disposed in the slit and mechanically interlocked with the first cam member,
   the conveying means including a second cam member which moves into the slit to engage the cam lever as the holder is driven forward, thereby acting through the cam lever to cause an elevating movement of the first cam member.

29. A cap conveying unit according to claim 1 in which the cap holder means is provided on a running endless chain at a given interval.

30. A cap conveying unit according to claim 29 in which the endless chain comprises a number of links connected together, each link including a hollow cylindrical portion and a forked portion, the hollow cylindrical portion of a succeeding link is rockably fitted in the forked portion of a preceding link, the hollow cylindrical portion having a solid cylindrical member rotatably fitted therein and which is connected to the fork portion by a connecting pin, the connecting pin having its one end connected to one limb of the forked portion, extending through a radial slit formed in one side of the hollow cylindrical portion to be connected to the solid cylindrical member and then extending through another radial slit formed in the other side of the hollow cylindrical portion to be connected to the other limb of the forked portion.

31. A cap conveying unit according to claim 30 in which the forked portion of each link is internally formed with a recess which allows a tooth of a sprocket to advance thereinto and engage therewith.

32. A cap conveying unit according to claim 1 in which the cap holder means is mounted on a reciprocable member, the cap holder means delivering a cap which it received to a capping head which applies the cap to a vessel which is conveyed on a straight line path.

33. A cap conveying unit according to claim 32, further including a pair of vessel grippers which hold a vessel therebetween.

34. A cap conveying unit according to claim 32 in which the capping head is mounted on an elevating frame which is elevatably disposed above a conveyor which conveys vessels, the elevating frame being mounted on a movable framework which is reciprocable in the direction in which the vessels are conveyed and adapted to be driven forward in tracking relationship with the vessel at the same speed as the vessel and which is then rapidly returned.

35. A cap conveying unit according to claim 32 in which a conveyor which conveys vessels is provided with vessel positioning push bars at a given interval, the vessels being brought into abutment against the push bars to define a given spacing therebetween and being conveyed in a consecutive one row.

36. A cap conveying unit according to claim 32, further including a guide rod disposed parallel to a conveyor which conveys vessels, a reciprocation actuating member reciprocably mounted on the guide rod, a movable plate mounted on the reciprocation actuating member and movable between a projected position where it projects toward the conveyor to hand a cap held by the cap holder means to a capping head and a retracted position where it is retracted from the conveyor, an arm mounted on the movable plate so as to be rockable in the vertical direction, the cap holder means being mounted on the arm, a movable cam engaging a cam follower disposed on the arm to raise the arm, a cylinder unit for moving the movable cam to a position where it engages the cam follower and to another position where it does not engage the cam follower, and a cap feeder disposed above a locus of travel depicted by the cap holder means as the reciprocation actuating member reciprocates with the movable plate located at its retracted position, the cap feeder feeding caps to the cap holder means whenever the movable cam acts through the cam follower and the arm to raise the cap holder means.

* * * * *

UNITED STATES PATENT AND TRADEMARK OFFICE
CERTIFICATE OF CORRECTION

PATENT NO. : 5 339 600
DATED : August 23, 1994
INVENTOR(S) : Ichirou HAMANO, et al It is certified that error appears in the above-indentified patent and that said Letters Patent is hereby corrected as shown below:

Column 28, line 22; change "has" to ---have---.
line 62; change "fork portion" to
---forked portion---.

Signed and Sealed this

Twenty-ninth Day of November, 1994

Attest:

BRUCE LEHMAN

Attesting Officer

Commissioner of Patents and Trademarks